(12) United States Patent
Hunt

(10) Patent No.: US 8,046,268 B2
(45) Date of Patent: Oct. 25, 2011

(54) MULTI-MERCHANT PAYMENT SYSTEM

(75) Inventor: Vince Hunt, Carmel, CA (US)

(73) Assignee: Shop MA, Inc., Miami, FL (US)

(*) Notice: Subject to any disclaimer, the term of this patent is extended or adjusted under 35 U.S.C. 154(b) by 415 days.

(21) Appl. No.: 12/172,995

(22) Filed: Jul. 14, 2008

(65) Prior Publication Data

US 2010/0010918 A1    Jan. 14, 2010

(51) Int. Cl.
*G06Q 30/00* (2006.01)

(52) U.S. Cl. .............. 705/26.1; 705/27.1; 705/27.2; 705/29

(58) Field of Classification Search ............ 705/26–27, 705/34, 40–41
See application file for complete search history.

(56) References Cited

U.S. PATENT DOCUMENTS

| | | | |
|---|---|---|---|
| 6,000,832 A * | 12/1999 | Franklin et al. | 700/232 |
| 6,324,525 B1 * | 11/2001 | Kramer et al. | 705/40 |
| 7,197,475 B1 * | 3/2007 | Lorenzen et al. | 705/26 |
| 7,499,889 B2 * | 3/2009 | Golan et al. | 705/50 |
| 7,548,889 B2 * | 6/2009 | Bhambri et al. | 705/64 |
| 7,742,994 B1 * | 6/2010 | Gupta | 705/64 |
| 2004/0039637 A1 * | 2/2004 | Kopf et al. | 705/14 |
| 2005/0027611 A1 * | 2/2005 | Wharton | 705/26 |
| 2006/0190332 A1 * | 8/2006 | Grider | 705/14 |
| 2006/0229996 A1 * | 10/2006 | Keithley et al. | 705/75 |
| 2008/0046338 A1 * | 2/2008 | Tarvydas et al. | 705/26 |
| 2009/0063295 A1 * | 3/2009 | Smith | 705/26 |
| 2009/0150262 A1 * | 6/2009 | Mizhen | 705/27 |
| 2009/0171804 A1 * | 7/2009 | Lee et al. | 705/26 |

* cited by examiner

*Primary Examiner* — Elda Milef

(74) *Attorney, Agent, or Firm* — Soquel Group LLC

(57) ABSTRACT

A method of payment for multi-vendor gift cards, comprising maintaining a merchandise database comprising records for merchandise and services for a plurality of merchants, enabling a gift card giver to interactively purchase a gift card for a gift card recipient, entitling the gift card recipient to redeem the gift card for items up to a specified spending limit, electronically transferring the money used to purchase the gift card into a card funding account that is used to pay for purchases by the gift card recipient, enabling the gift card recipient to interactively select one or more items from the merchandise database, thereby generating an aggregated selection of items for each merchant issuing orders to each merchant in accordance with the aggregated selected items corresponding to each merchant and paying each merchant the amount of their respective order from the card funding account.

37 Claims, 15 Drawing Sheets

PURCHASE A SHOP.COM GIFT CARD

PRICE $5.00 - $500.00

SELECT GIFT CARD AMOUNT [$25 ▼]

RECIPIENT NAME

EMAIL ADDRESS

CONFIRM EMAIL ADDRESS

MESSAGE: Happy Birthday Aunt Em !

ADD TO CART

VIEW ONECART

SAVE FOR LATER

EMAIL TO FRIEND

FIG. 2A

SHOP·COM™

○ MY SHOP / ○ APPAREL / ○ BEAUTY / ⌂ HOME & HOUSEWARES

HELLO, VINCE. NOT VINCE HUNT?

I'M SHOPPING FOR [                    ] IN [ APPAREL & ACCESSORIES ▼ ]

SEARCH WITHIN RESULTS
[ GO ]

APPAREL & ACCESSORIES, PANTS

SHOWING 1 – 36 OF 9,321   1 2 3 4 ... 259 NEXT
SORT BY [ BEST MATCH ▼ ]   SHOW [ 36 ITEMS PER PAGE ▼ ]

NARROW RESULTS BY

PRICE RANGE
$60 AND BELOW
$60 - $85
$85 - $115
$115 - $165
$165 AND ABOVE

FABRICS
COTTONS (7,040)
DENIM (2,759)
POLYESTER (1,069)
WOOL (817)
NYLON (552)
LEATHER (285)
LINEN (271)
FLEECE(146)

BOCA CLASSICS ® SIDE
ELASTIC CARGO PANTS
WAS $34.00
NOW $20.40
AVAILABLE FROM
BEALLSFLORIDA.COM
| SHOP•COM
| OneCart™
| TRUSTED MERCHANT
( SEE DETAILS ⊙ )

LEVI'S ® CARPENTER
LOOSE STRAIGHT PANTS
WAS $48.00
NOW $32.98
AVAILABLE FROM
CHARLESTON BIG & TALL
| SHOP•COM
| OneCart™
| TRUSTED MERCHANT
( SEE DETAILS ⊙ )

FIG. 2B

MULTI-MERCHANT PAYMENT SYSTEM

FIELD OF THE INVENTION

The present invention relates to electronic on-line commerce.

BACKGROUND OF THE INVENTION

E-commerce technology enables shoppers to purchase items of merchandise such as autos and clothes and items of service such as travel and insurance on-line, from websites that act as virtual stores. Pioneers of e-commerce include Amazon.com, Inc. of Seattle, Wash., eBay Inc. of San Jose, Calif., Expedia.com of Bellevue, Wash. and Shop.com of Monterey, Calif. E-commerce technology combines on-line catalog ingest, browsing and search, inventory management, purchase and payment transactions, automated payment processing, and other components within a comprehensive e-commerce system.

The growth of the Internet as a medium for e-commerce has led to tremendous growth of product and service offerings. One example of this growth is the expansion from single merchant e-commerce websites that act as virtual stores, to multi-merchant e-commerce websites that act as virtual shopping malls. The multi-merchant e-commerce website provides a single integrated website where shoppers can purchase goods and services from a wide diversity of merchants. Multi-merchant e-commerce websites are able to incorporate features of single merchant websites, and have the potential of offering features beyond those offered on single merchant websites.

One increasingly popular feature of single merchant websites, which has proven to be a substantial source of revenue, is the commerce of online gift giving. One component of a gift giving system is a gift card. A gift giving system enables a gift giver to purchase a gift card for a specified amount of money at a merchant's website. The gift card is physically or electronically delivered to a recipient, referred to as a "gift card recipient," designated by the gift giver. The gift card recipient can redeem the gift card for items of merchandise and/or services at the merchant's website. Typically, if his/her purchase amount is greater than the specified amount of the gift card, the gift card recipient pays the difference. If the purchase amount is less than the specified amount of the gift card, a balance remains on the gift card that can be used in the future.

Gift cards are typically based on a "closed loop" payment system in which the gift card recipient can only use or "redeem" the gift card at a single merchant's e-commerce website or store. In contrast, a credit card payment system constitutes an "open loop" payment system because a credit card can be used with many merchants, i.e. their use is not restricted to a single merchant or to a small number of merchants.

One drawback of a closed-loop gift card payment system is that a gift card recipient is limited to making product selections from a single merchant's e-commerce website and may not find sufficient items of interest. In this case a gift card may not be redeemed, or may be only partially redeemed, and yet the gift card giver was billed in full.

Implementing closed loop gift card payment systems on multi-merchant websites presents difficulties because each merchant requires a credit card or other form of payment. Thus, prior art multi-merchant payment systems required the gift card recipient to provide their own credit card at the time of purchase in order to pay the merchant whose merchandise and/or services the gift card recipient selected. For example, SHOP.COM, a provider of a multi-merchant e-commerce website, previously provided a gift card that required the gift card recipient to present a credit card with each purchase and the amount debited would later be credited or rebated to his/her credit card. This approach proved to not be attractive to shoppers.

Therefore it would be advantageous for a multi-merchant website to provide a payment system which acts as an open-loop payment system with respect to the gift card recipient allowing him/her to redeem the gift card from a large selection of merchants. Furthermore, it would be advantageous for a plurality of merchants' websites, including both multi-merchant and single merchant websites to provide a payment system which acts as a closed-loop payment system with respect to the gift card recipient by restricting the gift card recipient to make selections only from their websites.

Reward points programs, or loyalty programs, in which a consumer earns points for making purchases from or using the services provided by the company offering the reward points program, and can redeem these point for products or services at the company, are an example of a closed-loop payment system offered by many companies, including airlines, hotels and bookstores. Reward points programs are typically closed loop since the reward points can only be redeemed with the company offering the program. In contrast, the present invention enables a gift card giver to use reward points to purchase a gift card, thereby allowing a gift card recipient to select items of merchandise and/or services from a plurality of merchants. This effectively converts reward points programs into open-loop payment systems.

SUMMARY OF THE DESCRIPTION

The present invention concerns e-commerce including the purchase of products such as clothing, books, electronic equipment and vehicles, and services such as travel and insurance, and more specifically to multi-merchant on-line shopping websites. Aspects of the present invention provide methods for multi-merchant payment, which enable a gift card giver to purchase a gift card that can be redeemed by a gift card recipient for a plurality of items of merchandise and services from a plurality of merchants. Henceforth, the term "items" refers to items of merchandise, or services or both.

The present invention accepts payment from a gift card giver and establishes a temporary, or virtual, credit card account that is then used to pay each merchant for purchases made by a gift card recipient. A gift card is then created and sent to a gift card recipient. The gift card includes a unique gift card code that acts as a proxy for the virtual credit card by referencing the virtual credit card account. The gift card recipient redeems the gift card by selecting items of merchandise and/or services at a multi-merchant e-commerce website and providing the gift card code as a means of payment. A multi-merchant e-commerce server which provides the multi-merchant e-commerce website then aggregates the selected items according to merchant and issues orders to each merchant according to the aggregated selected items. The e-commerce server uses the gift card code to obtain the virtual credit card account information and it includes the virtual credit card account information with the order. The merchant uses the virtual credit card information to obtain payment and ships the selected items to the recipient(s) designated in the order. It may be appreciated that from the perspective of the merchant the virtual credit card is indistinguishable from an ordinary credit card, i.e. the merchant processes the virtual credit card in the same way as an ordinary credit card.

The advantage of the present innovation is that a gift card giver makes a single payment to purchase the gift card and a gift card receiver can make multiple purchases across different merchants using the gift card without having to provide a credit card or other means of payment for each purchase. In effect, a single credit card transaction by a gift card giver enables multiple purchases by a gift card recipient, each of which may be at a different time and with a different merchant. Another advantage provided by the present innovation is that by supplying a virtual credit card to a merchant along with an order the merchant may obtain payment at the time that the order is received rather than having to generate and send an invoice to the multi-merchant ecommerce server and receive payment at a later time.

There is thus provided in accordance with an embodiment of the present invention a means of payment for multi-vendor gift cards, comprising maintaining a merchandise database comprising records for merchandise and services for a plurality of merchants, each record including (i) a stock keeping unit (SKU) for an item of merchandise or service, (ii) a description of the item, (iii) a price of the item, and (iv) the merchant for the item, enabling a gift card giver to interactively purchase a gift card for a gift card recipient, entitling the gift card recipient to redeem the gift card for items up to a specified spending limit, electronically transferring the money used to purchase the gift card into a card funding account that is used to pay for purchases by the gift card recipient, enabling the gift card recipient to interactively select one or more items from the merchandise database, thereby generating an aggregated selection of items for each merchant, issuing orders to each merchant in accordance with the aggregated selected items corresponding to each merchant; and paying each merchant the amount of their respective order from the card funding account.

There is additionally provided in accordance with an embodiment of the present invention a system of payment for multi-vendor gift cards, comprising a data storage for maintaining a merchandise database comprising records for merchandise and services for a plurality of merchants, each record including (i) a stock keeping unit (SKU) for an item of merchandise or service, (ii) a description of the item, (iii) a price of the item, and (iv) the merchant for the item, a gift card generator for enabling a gift card giver to interactively purchase a gift card for a gift card recipient, entitling the gift card recipient to redeem the gift card for items up to a specified spending limit, an account manager for electronically transferring the money used to purchase the gift card into a card funding account that is used to pay for purchases by the gift card recipient, a gift card redeemer for enabling the gift card recipient to interactively select one or more items from the merchandise database, thereby generating an aggregated selection of items for each merchant, a transaction manager for issuing orders to each merchant in accordance with the aggregated selected items corresponding to each merchant, said orders including means of payment information that enables each merchant to obtain payment for the amount of their respective order from the card funding account.

There is moreover provided in accordance with an embodiment of the present invention a computer-readable storage medium storing program code for causing a computing device to maintain a merchandise database comprising records for merchandise and services for a plurality of merchants, each record including (i) a stock keeping unit (SKU) for an item of merchandise or service, (ii) a description of the item, (iii) a price of the item, and (iv) the merchant for the item, to enable a gift card giver to interactively purchase a gift card for a gift card recipient, entitling the gift card recipient to redeem the gift card for items up to a specified spending limit, to electronically transfer the money used to purchase the gift card into a card funding account that is used to pay for purchases by the gift card recipient, to enable the gift card recipient to interactively select one or more items from the merchandise database, thereby generating an aggregated selection of items for each merchant, to issue orders to each merchant in accordance with the aggregated selected items corresponding to each merchant; and to pay each merchant the amount of their respective order from the card funding account.

There is further provided in accordance with an embodiment of the present invention a means of payment for multi-vendor gift cards, comprising maintaining a merchandise database comprising records for merchandise and services for a plurality of merchants, each record including (i) a stock keeping unit (SKU) for an item of merchandise or service, (ii) a description of the item, (iii) a price of the item, and (iv) the merchant for the item, enabling a gift card giver to interactively purchase a gift card for a gift card recipient, entitling the gift card recipient to redeem the gift card for items up to a specified spending limit, creating a virtual credit card account for said gift card to enable payment for the items redeemed by the gift card recipient, enabling the gift card recipient to interactively select one or more items from the merchandise database, thereby generating an aggregated selection of items for each merchant, issuing orders to each merchant in accordance with the aggregated selected items corresponding to each merchant, and providing information about the virtual credit card to each merchant for obtaining payment for the orders issued to the merchant.

There is additionally provided in accordance with an embodiment of the present invention a system of payment for multi-vendor gift cards, comprising a data storage for maintaining a merchandise database comprising records for merchandise and services for a plurality of merchants, each record including (i) a stock keeping unit (SKU) for an item of merchandise or service, (ii) a description of the item, (iii) a price of the item, and (iv) the merchant for the item, a gift card generator for enabling a gift card giver to interactively purchase a gift card for a gift card recipient, entitling the gift card recipient to redeem the gift card for items up to a specified spending limit, an account manager for creating a virtual credit card account for said gift card to enable payment for the items redeemed by the gift card recipient, a gift card redeemer for enabling the gift card recipient to interactively select one or more items from the merchandise database, thereby generating an aggregated selection of items for each merchant, and a transaction manager for issuing orders to each merchant in accordance with the aggregated selected items corresponding to each merchant, said orders including virtual credit card information that enables each merchant to obtain payment for the amount of their respective order.

There is moreover provided in accordance with an embodiment of the present invention a computer-readable storage medium storing program code for causing a computing device to maintain a merchandise database comprising records for merchandise and services for a plurality of merchants, each record including (i) a stock keeping unit (SKU) for an item of merchandise or service, (ii) a description of the item, (iii) a price of the item, and (iv) the merchant for the item, to enable a gift card giver to interactively purchase a gift card for a gift card recipient, entitling the gift card recipient to redeem the gift card for items up to a specified spending limit, to create a virtual credit card account for said gift card to enable payment for the items redeemed by the gift card recipient, to enable the gift card recipient to interactively select one or more items from the merchandise database, thereby generating an aggregated selection of items for each merchant, to issue orders to each merchant in accordance with the aggregated selected items corresponding to each merchant, and to provide information about the virtual credit card to each merchant for obtaining payment for the orders issued to the merchant.

There is additionally provided in accordance with an embodiment of the present invention a method of electronic payment, comprising maintaining a merchandise database comprising records for merchandise and services for a plurality of merchants, each record including (i) a stock keeping unit (SKU) for an item of merchandise or service, (ii) a description of the item, (iii) a price of the item, and (iv) the merchant for the item, enabling a shopper to interactively create a shopper account that enables the shopper to purchase items of merchandise or services recorded in said merchandise database, maintaining a purchase database comprising records for shopper accounts, each record including (i) a unique shopper identifier, (ii) a shopper name, and (iii) a shopper account balance that keeps track of the amount of money available to said shopper, creating a virtual credit card account for said shopper account to enable payment for items selected by the shopper, enabling the shopper to interactively select one or more items from the merchandise database, thereby generating an aggregated selection of items for each merchant, issuing orders to each merchant in accordance with the aggregated selected items corresponding to each merchant, and providing information about the virtual credit card to each merchant for obtaining payment for the orders issued to the merchant.

There is moreover provided in accordance with an embodiment of the present invention a system of electronic payment, comprising a data storage for maintaining a merchandise database comprising records for merchandise and services for a plurality of merchants, each record including (i) a stock keeping unit (SKU) for an item of merchandise or service, (ii) a description of the item, (iii) a price of the item, and (iv) the merchant for the item, a gift card generator for enabling a shopper to interactively create a shopper account that enables the shopper to purchase items recorded in said merchandise database, said data storage for further maintaining a purchase database comprising records for shopper accounts, each record including (i) a unique shopper identifier, (ii) a shopper name, and (iii) a shopper account balance that keeps track of the amount of money available to said shopper, an account manager for creating a virtual credit card account for said shopper account to enable payment for items of merchandise and service selected by the shopper, a gift card redeemer for enabling the shopper to interactively select one or more items from the merchandise database, thereby generating an aggregated selection of items for each merchant, a transaction manager for issuing orders to each merchant in accordance with the aggregated selected items corresponding to each merchant, said orders including virtual credit card information that enables each merchant to obtain payment for the amount of their respective order.

There is further provided in accordance with an embodiment of the present invention a computer-readable storage medium storing program code for causing a computing device to maintain a merchandise database comprising records for merchandise and services for a plurality of merchants, each record including (i) a stock keeping unit (SKU) for an item of merchandise or service, (ii) a description of the item, (iii) a price of the item, and (iv) the merchant for the item, to enable a shopper to interactively create a shopper account that enables the shopper to purchase items recorded in said merchandise database, to maintain a purchase database comprising records for shopper accounts, each record including (i) a unique shopper identifier, (ii) a shopper name, and (iii) a shopper account balance that keeps track of the amount of money available to said shopper, to create a virtual credit card account for said shopper account to enable payment for items selected by the shopper, to enable the shopper to interactively select one or more items from the merchandise database, thereby generating an aggregated selection of items for each merchant, to issue orders to each merchant in accordance with the aggregated selected items corresponding to each merchant, and to provide information about the virtual credit card to each merchant for obtaining payment for the orders issued to the merchant.

There is additionally provided in accordance with an embodiment of the present invention a method of electronic payment, comprising enabling a shopper to interactively create a shopper account, maintaining a purchase database, by a payment server, comprising records for shopper accounts, each record including (i) a unique shopper identifier, (ii) a shopper name, and (iii) a shopper account balance that keeps track of the amount of money available to said shopper and comprising records for merchants, enabling the shopper to interactively select one or more items of merchandise and services from one or more merchants' e-commerce websites, and enabling the shopper to provide said unique shopper identifier as a means of payment to the merchants' e-commerce websites.

There is further provided in accordance with an embodiment of the present invention a system of electronic payment, comprising a gift card generator for enabling a shopper to interactively create a shopper account, a data storage for maintaining a purchase database, by a payment server, comprising records for shopper accounts, each record including (i) a unique shopper identifier, (ii) a shopper name, and (iii) a shopper account balance that keeps track of the amount of money available to said shopper and comprising records for merchants, a gift card redeemer for enabling the shopper to interactively select one or more items from one or more merchants' e-commerce websites, and a plurality of merchants' e-commerce websites enabling the shopper to provide said unique shopper identifier as a means of payment.

There is additionally provided in accordance with an embodiment of the present invention a computer-readable storage medium storing program code for causing a computing device to enable a shopper to interactively create a shopper account, to maintain a purchase database, by a payment server, comprising records for shopper accounts, each record including (i) a unique shopper identifier, (ii) a shopper name, and (iii) a shopper account balance that keeps track of the amount of money available to said shopper and comprising records for merchants, to enable the shopper to interactively select one or more items from one or more merchants' e-commerce websites, and to enable the shopper to provide said unique shopper identifier as a means of payment to the merchants' e-commerce websites.

BRIEF DESCRIPTION OF THE DRAWINGS

The present invention will be more fully understood and appreciated from the following detailed description, taken in conjunction with the drawings in which:

FIG. 2A is an example user interface that enables a gift card giver to purchase a gift card, in accordance with an embodiment of the present invention;

FIG. 2B is an example user interface that enables a gift card recipient to browse for merchandise and services in a multi-merchant website, in accordance with an embodiment of the present invention;

DETAILED DESCRIPTION

Aspects of the present invention concern inter alia a multi-merchant payment system, which enables a gift card recipient to redeem the gift card by selecting one or more items at a multi-merchant website. As employed herein, a multi-merchant website is a single website that enables a shopper to search for, browse, select, purchase and redeem items of merchandise and/or services from a plurality of merchants. Further, in the present invention, said merchants are the "merchants of record" for shoppers' e-commerce credit card transactions, meaning that merchants charge shoppers' credit cards directly. The term "item" as employed herein refers to an item of merchandise such as an automobile or an item of service such as auto insurance.

Figure 1:
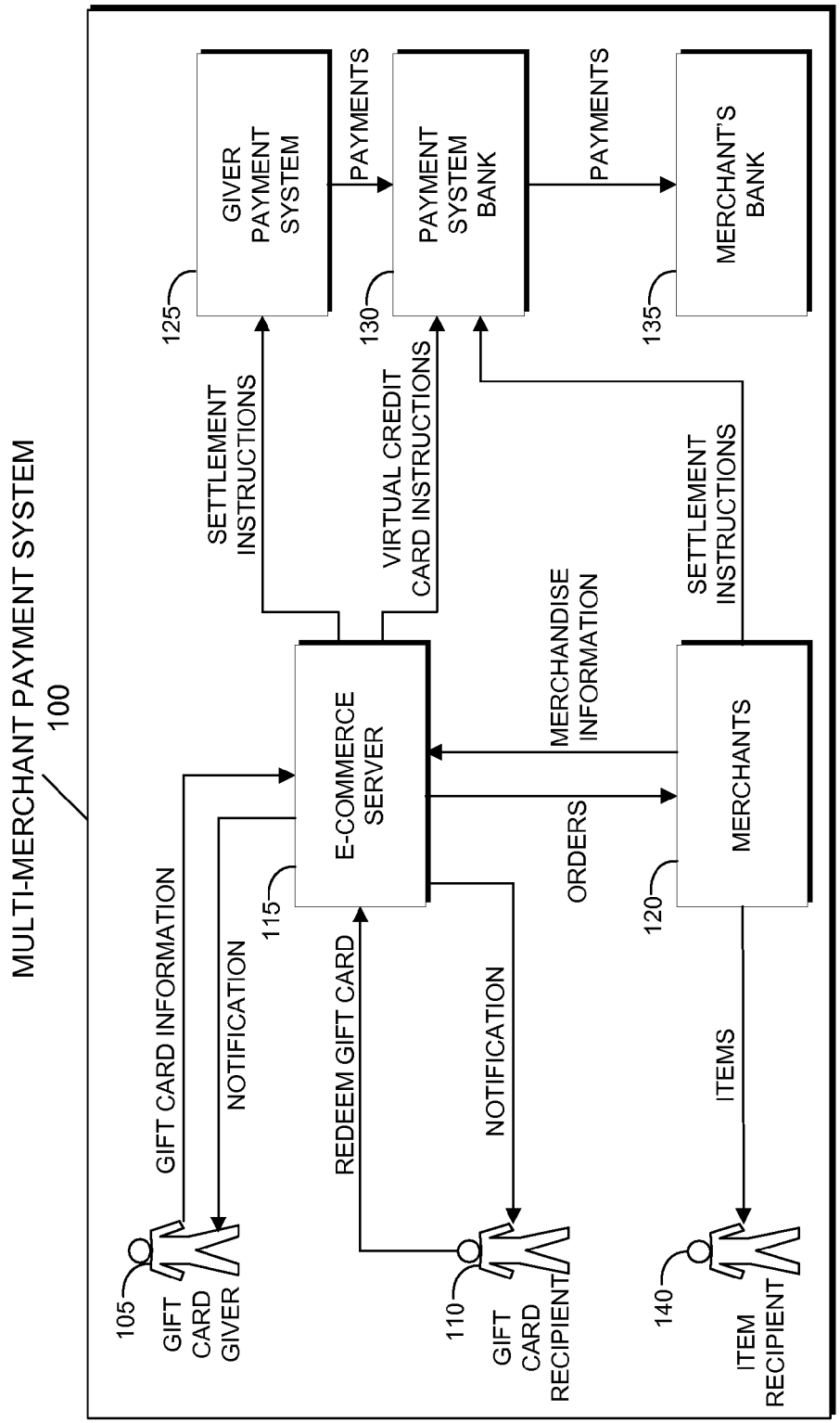
FIG. 1 is simplified block diagram of a multi-merchant payment system that enables a gift card giver to purchase a gift card and for a gift card recipient to redeem the gift card by selecting items from a multi-merchant website, in accordance with an embodiment of the present invention.

Reference is now made to FIG. 1, which is a simplified block diagram of a multi-merchant payment system 100 that enables a gift card giver to purchase a gift card and for a gift card recipient to select items from a multi-merchant website, in accordance with an embodiment of the present invention. Shown in FIG. 1 is an e-commerce server 115 which interacts with at least one gift card giver 105, at least one gift card recipient 110, a plurality of merchants 120, at least one giver payment system 125, and at least one payment system bank 130.

E-commerce server 115 is a server computer system that enables merchants 120 to publish and showcase their catalogues of merchandise and services on a single integrated website, referred to as a multi-merchant website, which functions as a virtual shopping mall. E-commerce server 115 is represented as a single computer in FIG. 1 for the sake of clarity. However, e-commerce server 115 may be embodied in a single computer, or distributed as multiple computers communicating with one another. In the embodiment shown in FIG. 9, for example, e-commerce server 115 includes multiple Web application servers, administration servers, search servers, and load balancers.

Shoppers browsing the website are able to purchase one or more items from any merchant 120 that participates in the multi-merchant website by providing information about their items and enabling shoppers to purchase their items from the multi-merchant website. For purposes of clarity, henceforth the terms user and shopper both refer to a person that uses a Web browser such as Mozilla Firefox or Microsoft Internet Explorer together with a client computer or a mobile device that provides access to e-commerce server 115. Examples of mobile devices that provide access include the Apple iPhone provided by Apple Computer of Cupertino Calif., the Blackberry provided by Research in Motion of Waterloo, Ontario, and the Treo provided by Palm. Inc. of Sunnyvale, Calif. Generally, users of e-commerce server 115 register with the system by providing basic user information including inter alia name, physical address, e-mail address, means of payment information, shipping information, and personal information that may be used for authenticating the user.

In accordance with an embodiment of the present invention, users may purchase gift cards for other users. A gift card giver 105 is a user that purchases a gift card from the multi-merchant website implemented by e-commerce server 115. Whereas, a gift card recipient 110 is a user that redeems a gift card from a multi-merchant website implemented by e-commerce server 115. At the time of purchase, gift card giver 105 supplies inter alia the name and contact information for a gift card recipient 110, the amount of the gift card, and means of payment information. Means of payment may include inter alia a credit card or points from a merchant reward points system such as a frequent flyer program, credit card reward points program or hotel reward points program. Gift card giver 105 may also apply an existing credit with multi-merchant payment system 100 when purchasing a gift card. An example user interface that enables gift card giver 105 to purchase a gift card is described with reference to FIG. 2A.

E-commerce server 115 uses the supplied means of payment information to request payment, from a giver payment system 125. Giver payment system 125 may be inter alia a credit card network in the case that gift card giver 105 supplied a credit card as his/her means of payment, or a reward points system in the case that gift card giver 105 supplied reward points program information. Typically, giver payment system 125 responds by depositing the requested amount into a "card funding account" in a payment system bank 130 designated by e-commerce server 115.

Upon receipt of payment in payment system bank 130, e-commerce server 115 establishes a "virtual credit card account" for the gift card. The virtual credit card account acts like a standard credit card account in that it is established, funded, has a unique credit card number, and is guaranteed and operated by a bank. The initial amount credited to the virtual credit card acts as an initial limit against which purchases can be made and fees may be assessed. The act of establishing this initial amount is referred to as "loading" the virtual credit card account. The key differences between a virtual credit card and a standard credit card are that (1) the virtual credit card is created for the sole purpose of funding purchases linked to a specific gift card, (2) it is managed by e-commerce server 115 and not by gift card recipient 110, (3) it is terminated when the gift card has been used up, i.e. it is temporary in nature, and (4) no physical credit card is ever issued. Establishing and loading a virtual credit card are two of the virtual credit card instructions that e-commerce server 115 may issue to payment system bank 130. Other instructions include reloading, i.e. adding funds to a virtual credit card account, and closing a virtual credit card account.

The virtual credit card is secure; the actual credit card number is stored and managed by payment system bank 130 which generates a proxy credit card number that it provides to e-commerce server 115 for use by gift card recipient 110.

After creating the virtual credit card, e-commerce server 115 notifies gift card recipient 110 that he/she has been given a gift card and provides him/her with instructions on how to redeem the gift card. Typically, the instructions include the proxy credit card number which are referred to as a "gift card code." To redeem a gift card, gift card recipient 110 visits the multi-merchant website provided by e-commerce server 115 and selects one or more items. Such an order is referred to as a "gift card order". An example of a user interface that gift card recipient might use to browse for items of interest is described with reference to FIG. 2B.

Gift card recipient 110 may "reload" the virtual credit card number at any time by supplying means of payment information, e.g. his/her credit card, and indicating how much money he/she wants to add to his/her virtual credit card account. Typically, gift card recipient 110 reloads his/her virtual credit card when he/she redeems his/her gift card by selecting items and the cost of the items exceed the remaining balance on the gift card. This case is described further with reference to FIG. 3A.

After selecting one or more items gift card recipient 110 finalizes his/her order by checking out. During the checkout process, gift card recipient 110 provides shipping and payment information and may review the order details. When providing payment information gift card recipient 110 indicates that he/she wishes to pay using a gift card and provides the gift card code. If the amount of the order is greater than the remaining balance then the gift card recipient is prompted to provide a credit card or other means of payment such as points from a rewards program. This supplemental means of payment is then used to reload the virtual credit card with the full amount of the order. An example user interface that enables gift card recipient 110 to provide shipping, payment and billing information is described with respect to FIG. 2C. When the checkout process is complete, e-commerce server 115 aggregates the selected items according to merchant and issues orders to each merchant 120 according to the aggregated selected items. E-commerce server 115 includes the virtual credit card account information with the order.

The order sent to each merchant 120 according to the aggregated selected items includes the virtual credit card account information. Merchant 120 uses the virtual credit card information to request authorization and settlement for the amount from payment system bank 130. Payment system bank 130 authorizes and settles the credit card transaction and payment is made to a designated account in merchant's bank 135. Each merchant 120 ships the selected items to one or more item recipients 140 as indicated in the order. Item recipient 140 may be any individual, regardless of whether said individual is a registered user. Further item recipient 140 may be the same individual as gift card recipient 110 in the event that gift card recipient 110 purchases an item for hisself/herself.

Figure 2C:
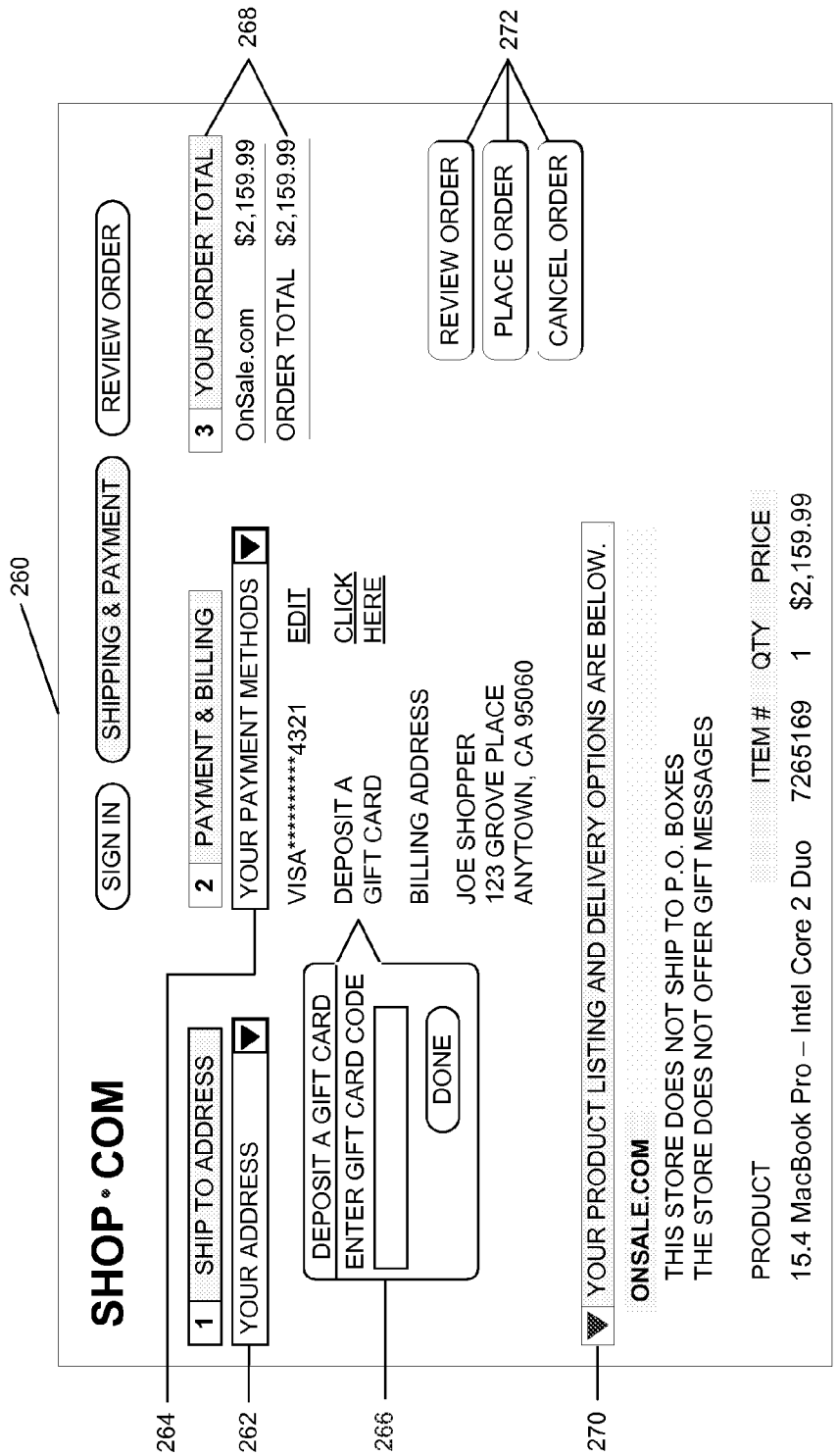
FIG. 2C is an example user interface that enables a gift card recipient to redeem a gift card and to provide shipping, payment and billing information for his/her order, in accordance with an embodiment of the present invention.

Reference is now made to FIG. 2A which is an example user interface that enables a gift card giver to purchase a gift card, in accordance with an embodiment of the present invention. In this embodiment, the same method is used to purchase a gift card as to purchase an item of merchandise or service. Using the multi-vendor website's search and browse tools, gift card giver 105 locates the gift card item and selects it. In response, user interface 200 appears. As indicated in message 202, a gift card with an amount between $5 and $500 can be purchased. It may be appreciated by one skilled in the art that the limitation on the gift card amount in user interface 200 to between $5 and $500 is arbitrary and that the present invention will enable the purchase of gift cards of any amount. Gift card giver 105 selects a denomination, i.e. a gift card amount, from a denominations menu 204. Gift card giver 105 enters a gift card recipient name 206, an email address 208 for gift card recipient 110, confirmation of email address 210 for gift card recipient 110, and an optional message 212 that will be included along with the gift card and delivered to gift card recipient 110. When gift card giver 105 has finished entering the information on the left side of user interface 200 he/she may use an "add to cart" control 214 to add the gift card to his/her shopping cart. A set of controls 216 enables gift card giver 105 to view his/her shopping cart, to save the information entered in user interface 200 for later, or to email details of the gift card to a friend. Once the gift card has been added to the shopping cart using "add to cart" control 214 the method for purchasing the gift card or "checking out" is identical to that used to purchase any other item from the multi-merchant website. An example of checking out is described below with reference to FIG. 2C.

Reference is now made to FIG. 2B which is an example user interface that enables a gift card recipient 110 to browse for merchandise and services in a multi-merchant website, in accordance with an embodiment of the present invention. Typically, gift card recipient 110 begins browsing from a home page, which is a web page that displays a list of categories of merchandise and services. On the home page, gift card recipient 110 may inter alia select a category from the list of categories or search entering keywords into a search box. User interface 230 appears after gift card recipient 110 selects "Apparel" from the home page and then selects the subcategory "Men's Pants." User interface 230 displays two products 232: "Boca Classics® Side Elastic Cargo Pants", and "Levi® Carpenter Loose Straight Pants." Each product made available by a different merchant 120: the Boca Classics Cargo Pants are available from BeallsFlorida.com and the Levi's Carpenter pants are available from Charleston Big & Tall. Gift card recipient 110 may click on the photo or product name to obtain additional information about the product. Gift card recipient 110 may inter alia click on a different top level category 234 which include "my shop", "apparel", "beauty", "home & housewares", or select a price range 236, or a fabric 238. At any time gift card recipient 110 may click on a shopping cart control 240 to inter alia change the quantity of an item, delete an item, or check out.

Reference is now made to FIG. 2C which is an example user interface that enables a gift card recipient to redeem a gift card and to provide shipping, payment and billing information for his/her order, in accordance with an embodiment of the present invention. Typically, every web page provided by the multi-merchant website includes a navigation control that enables gift card recipient 110 to visit their shopping cart. Several of the capabilities provided by a shopping cart are shown in example user interface 260. Gift card recipient 110 may select a ship to address from a menu of ship to addresses 262 that he/she has previously supplied. Alternatively, gift card recipient 110 may add a new ship to address. Gift card recipient 110 may select a payment method from a payment method menu 264. If gift card recipient 110 selects "Gift Card" as the payment method then a gift card code prompt 266 appears that enables gift card recipient 110 to enter a code of a gift card that they wish to use to pay for the items they have selected and which are in the shopping cart. If the amount of the order exceeds the balance of the gift card referenced by the gift card code then gift card recipient 110 may provide an additional payment method, e.g. a credit card or points from a rewards program, to pay the difference between the balance of the gift card and the amount of the order. The items in the shopping cart are shown in an order total box 268 aggregated by merchant. A product listing section 270 lists the items selected aggregated by merchant together with any special information for the merchant including inter alia shipping and delivery options. A set of controls 272 enables gift card recipient 110 to review the order, place the order, or cancel the order.

Figure 3A:
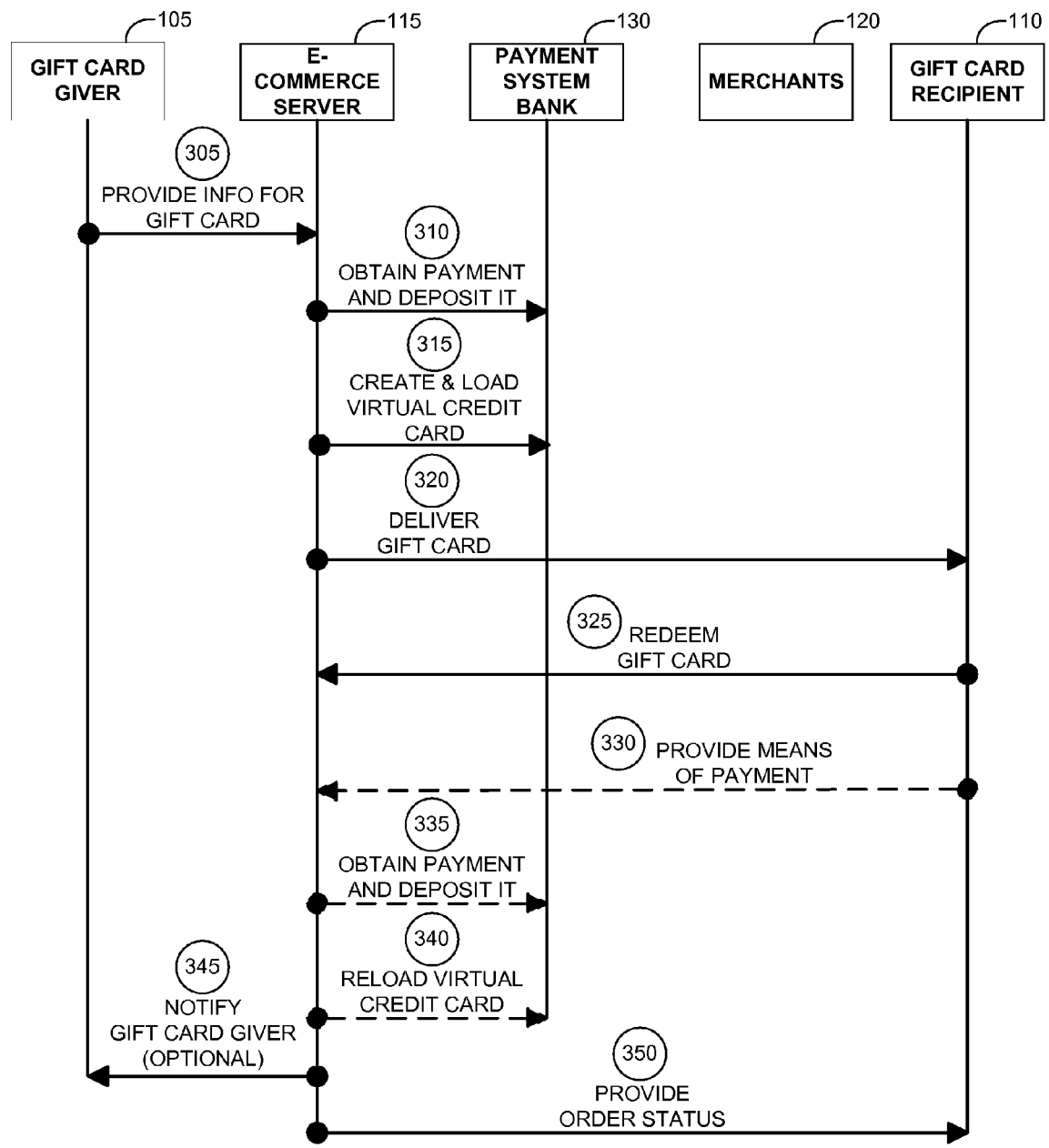
FIG. 3A is a simplified diagram of an overall method performed by a multi-merchant payment system, in accordance with an embodiment of the present invention.

Reference is now made to FIG. 3A which is a simplified diagram of an overall method performed by a multi-merchant payment system, in accordance with an embodiment of the present invention. At step 305 gift card giver 105 provides the necessary information to e-commerce server 115 to purchase a gift card including their means of payment information. In one embodiment, gift card giver 105 may, at their option, request that a notification be provided when the gift card has been redeemed. At step 310 e-commerce server 115 uses the provided means of payment information to obtain payment and causes the payment to be deposited into a designated account in payment system bank 130. The method for obtaining payment varies for each means of payment. One method for obtaining payment for a credit card is described in greater detail with respect to FIG. 6A. In general, e-commerce system 130 interoperates with a plurality of giver payment systems 125. Typically, e-commerce system 130 provides instructions to giver payment system 125 to directly deposit the amount of the gift card minus any transaction fees that may be assessed into a designated account, referred to as a "card funding account", in payment system bank 130. Upon successful completion of step 310, the card funding account has been credited for the amount of the gift card purchase minus any transaction fees incurred in the transaction. An example of such a transaction fee will be discussed with reference to FIG. 6A.

At step 310, if the attempt by e-commerce server 115 to obtain payment fails then gift card giver 105 is notified as such and given the opportunity to provide a different means of payment and the method restarts at step 305.

At step 315 e-commerce server 115 creates a virtual credit card account and loads it with the amount of the gift card. In this step, e-commerce server 115 also creates a "gift card record" which is a database record that includes information about the gift card such as the gift card code, gift card recipient name, balance, and expiration date. Then, at step 320 e-commerce server 115 issues the gift card and delivers it to gift card recipient 110. Typically, the gift card is delivered by email. In one embodiment, gift card giver 105 can request that a physical, printed, gift card be delivered to gift card recipient. In this embodiment, e-commerce server 115 may issue instructions to an external organization that fulfills the printing, packaging and shipping of physical gift cards.

At step 325 gift card recipient 110 redeems the gift card by visiting the multi-merchant website provided by e-commerce server 115 and selecting one or more items. In one embodiment, if gift card recipient 110 is not yet a registered user he/she is required to register and establish an account with e-commerce server 115. The cumulative price of all items selected by gift card recipient 110 including tax and shipping and handling charges is subtracted from the current balance stored in the gift card record. If the balance is positive or zero, i.e. the cumulative price is less than current balance, then the gift card record balance is updated. If the balance is negative then gift card recipient 110 is informed as such and they are requested to provide a means of payment to cover the difference. At step 330, which appears as a broken line in the figure because it is a conditional step, gift card recipient 110 provides means of payment information to e-commerce server 115. At step 335, also a conditional step, e-commerce server 115 uses the provided means of payment information to obtain payment and causes the payment to be deposited into the previously established card funding account for the gift card. At step 340 e-commerce server 115 "reloads", or adds to, the virtual credit card account the amount deposited into the card funding account. The card funding account is used to secure the virtual credit card account.

If gift card giver 105 requests notification upon redemption of the gift card, then at step 345 such notification is made by e-commerce server 115. Such notification is typically in the form of an email message.

At step 350, e-commerce server 115 provides notification of the status of the gift card order to gift card recipient, indicating the items that have been ordered.

Figure 3B:
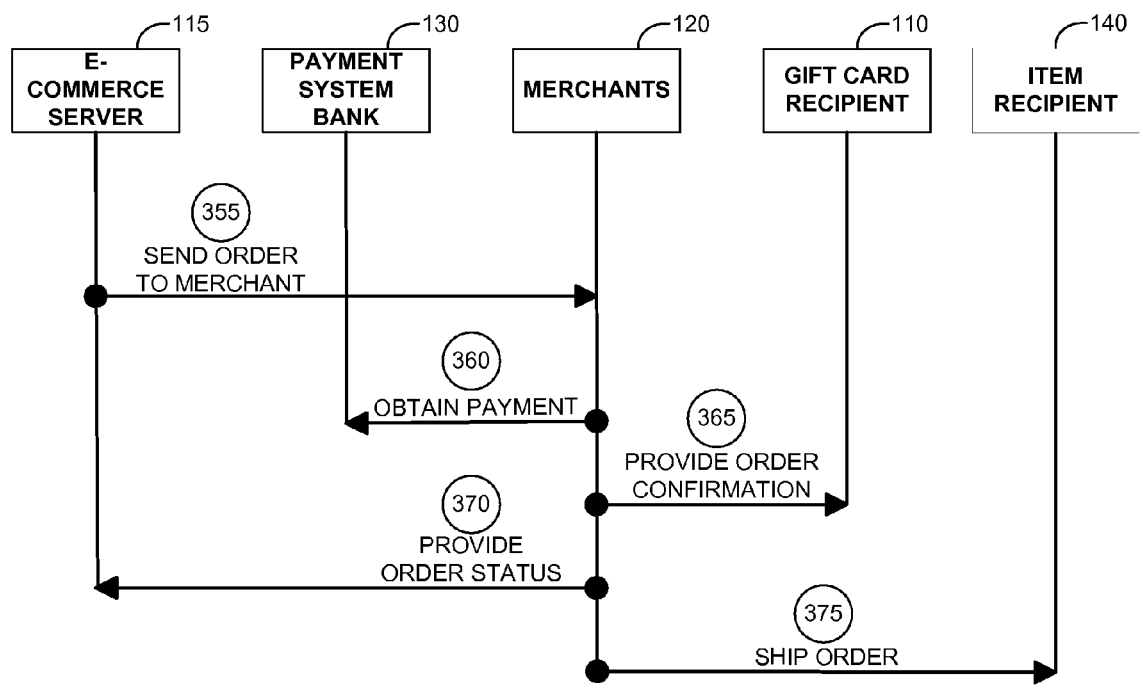
FIG. 3B, a continuation of FIG. 3A, is a simplified diagram of the overall method performed by a multi-merchant payment system, in accordance with an embodiment of the present invention.

Reference is now made to FIG. 3B, a continuation of FIG. 3A, which is a simplified diagram of the overall method performed by a multi-merchant payment system, in accordance with an embodiment of the present invention. At step 355 e-commerce server 115 aggregates the selected items according to merchant and sends orders to each merchant 120 from which an item has been ordered. E-commerce server 115 sends the virtual credit card information with each order.

At step 360 merchant 120 obtains payment from the card funding account in payment system bank 130. At step 365 merchant 120 provides confirmation of the order to gift recipient 110. At step 370 merchant 120 provides order status to e-commerce server 115. Finally, at step 375, merchant 120 ships the items specified in the order to item recipient 140. Depending on the size, availability and location of the items more than one shipment may be required to fulfill the order.

Figure 4:
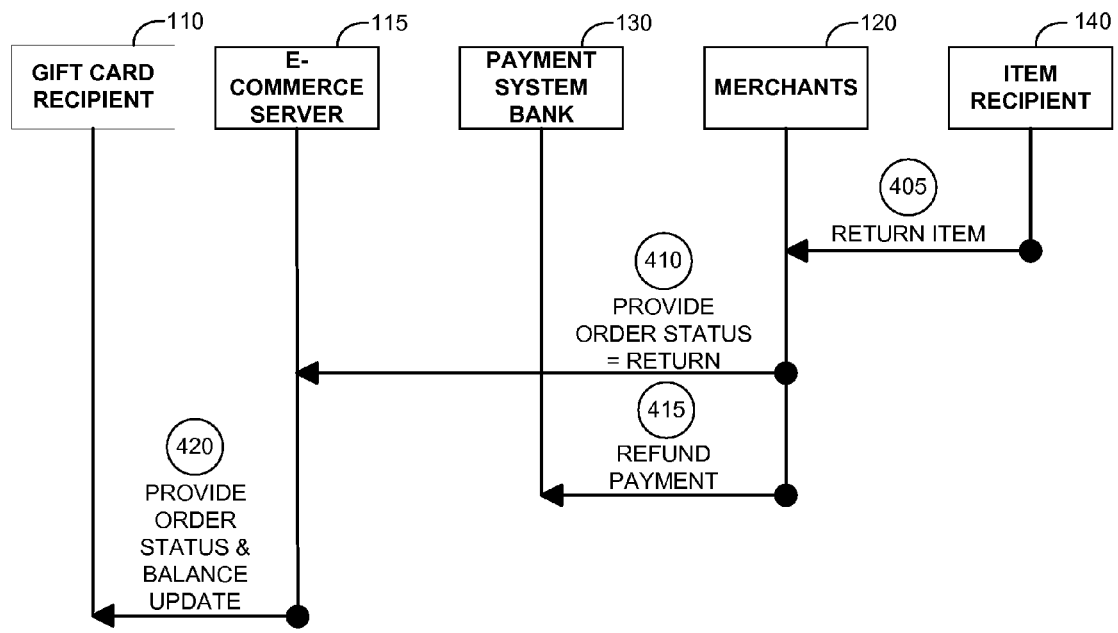
FIG. 4 is a simplified diagram of a method for returning an item obtained using a gift card from a multi-merchant e-commerce system, in accordance with an embodiment of the present invention.

Reference is now made to FIG. 4 which is a simplified diagram of a method for returning an item obtained using a gift card from a multi-merchant e-commerce system, in accordance with an embodiment of the present invention. This method concerns the return of an item ordered by gift card recipient 110 using a gift card and shipped to item recipient 140. At step 405 item recipient 140 returns the item to merchant 120. The precise method for returning an item is outside the scope of the present invention. However, typically item recipient 140 would call or email merchant 120 prior to actually shipping back the item. Merchant 120 might provide a return merchandise authorization (RMA) number together with shipping instructions. Item recipient 140 would then re-package and ship the item to merchant 120, possibly providing said RMA number on or inside the package.

At step 410 merchant 120 provides e-commerce server 115 an updated order status indicating that the item has been returned. Then, at step 415 merchant 120 repays the amount of the item returned to the card funding account in payment system bank 130. In one embodiment, merchant 120 may reduce the credited amount by inter alia a restocking or shipping fee. Finally, at step 420, e-commerce server 115 notifies gift card recipient 110 of the status of the returned order indicating the new balance for the gift card.

Figure 5:
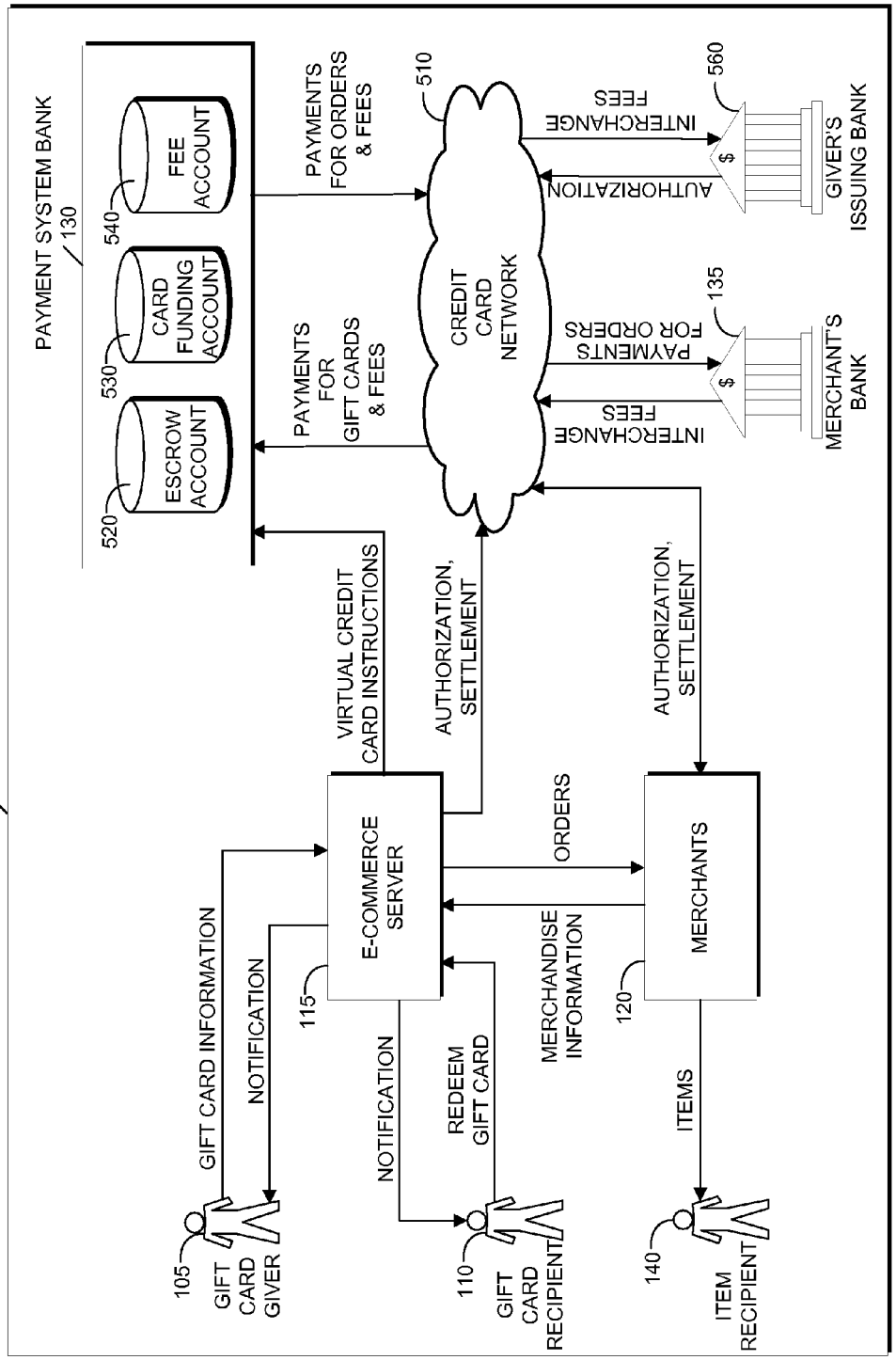
FIG. 5 is a simplified block diagram of a multi-merchant credit card payment system that enables gift card givers to purchase gift cards using credit cards and for an e-commerce server to issue order to merchants using credit cards, in accordance with an embodiment of the present invention.

Reference is now made to FIG. 5 which is a simplified block diagram of a multi-merchant credit card payment system that enables gift card givers to purchase gift cards using credit cards and for an e-commerce server to issue orders to merchants using credit cards, in accordance with an embodiment of the present invention. FIG. 5 illustrates one embodiment of multi-merchant payment system 100 described with reference to FIG. 1 in which payments are made using credit cards. Credit cards, including inter alia VISA, MasterCard, American Express and Discover, are an increasingly popular form of payment by shoppers. Credit card transactions are carried out across a credit card network 510.

For purposes of clarity, credit card network 510 includes a credit card processor for e-commerce server 115, a credit card processor for merchant 120 and a credit card network supported by each credit card processor. To further clarify, when a merchant receives an order from e-commerce server 115 and accepts a virtual credit card as payment for the order, the virtual credit card number, the amount, and an unique merchant identification code travel over their respective credit card processor's computer network. The credit card processor can either be a bank or a company that provides credit card processing services. From the processor's network the transaction goes to a credit card computer network. The electronic transaction travels across the network to the bank that actually issued the card, commonly referred to as the "issuing bank". The issuing bank checks the account and verifies that there is adequate credit in the virtual credit card account to cover the purchase. The issuing bank then sends the merchant an authorization over the network. At this point, the sale is complete. Next, the transaction is "settled." Settlement of a transaction occurs when the issuing bank for the virtual credit card debits the corresponding card funding account and makes the appropriate payment to the merchant's bank. The credit card network deducts a transaction fee from the payment to the merchant's bank which are allocated between the issuing bank and the credit card network itself.

In the embodiment illustrated in FIG. 5, gift card giver 105 uses a credit card as his/her means of payment for a gift card and provides the necessary credit card information including inter alia his/her name, the type of credit card, a credit card number and expiration date along with additional details about the order such as the destination(s).

E-commerce server 115 uses the credit card information to request authorization and settlement from credit card network 510. Through credit card network 510, a giver's issuing bank 560 authorizes or rejects the request for credit. As previously discussed, giver's issuing bank 560 is the bank that issued the credit card provided by gift card giver 105 as payment for the gift card. The transaction is subsequently settled and the funds are credited to a card funding account 530 in payment system bank 130. The full amount of the gift card is credited to card funding account 530. Typically, a transaction fee, commonly referred to as an "interchange fee," is assessed and is withdrawn from a fee account 540. The amount of the gift card appears on a periodic bill from giver's issuing bank 560 to the credit cardholders i.e. gift card giver 105.

As previously described, after payment for the gift card has been successfully processed, e-commerce server 115 issues instructions to payment system bank 130 to establish and load a virtual credit card account. Next, e-commerce server creates a gift card record for the gift card which includes a unique gift card code. The gift card code is a unique alphanumeric string. It should be noted that payment system bank 130 is the issuing bank for the virtual credit card. Thus, any interchange fees collected by credit card network 510 for use of the virtual credit card will be paid to payment system bank 130. In one embodiment, payment system bank 130 shares interchange fees collected for use of virtual credit cards with the operator of multi-merchant credit card payment system 500. The shared payment is paid into a specially designated fee account 540.

The gift card code, which is subsequently provided to and used by gift card recipient 110 serves as an alias, or index, to the virtual credit card number. The gift card code is used by gift card recipient 110 to redeem items on the multi-merchant website. The gift card acts as a "closed-loop" payment system with respect to the gift card recipient 110 since it cannot be used outside multi-merchant payment system 500 while the virtual credit card account allows it to also act an "open-loop" payment method with respect to merchants 120 since the virtual credit card is used to pay a plurality of merchants 120.

It may be appreciated that e-commerce server may work in conjunction with commercial services such as those provided by eFunds and Metavante to establish the virtual credit card account for the gift card.

As previously described, e-commerce server 115 issues an order to each merchant 120 from which gift card recipient 110 selected an item. As previously noted, the order includes the virtual credit card information for the gift card. As with any other credit card transaction, merchant 120 uses the virtual credit card information to request authorization and settlement from credit card network 510. Using credit card network 510, payment system bank 130 authorizes and settles the transaction, crediting the amount to a specified account in a merchant's bank 135. The amount credited is the amount of the gift card purchase minus an interchange fee. The credit card network pays the interchange fee to payment system bank 130 which is the issuing bank for the virtual credit card that was used to pay merchant 120. By mutual agreement, payment system bank 130 pays a share of interchange fees that it collects for use of virtual credits cards into fee account 540.

Figure 6A:
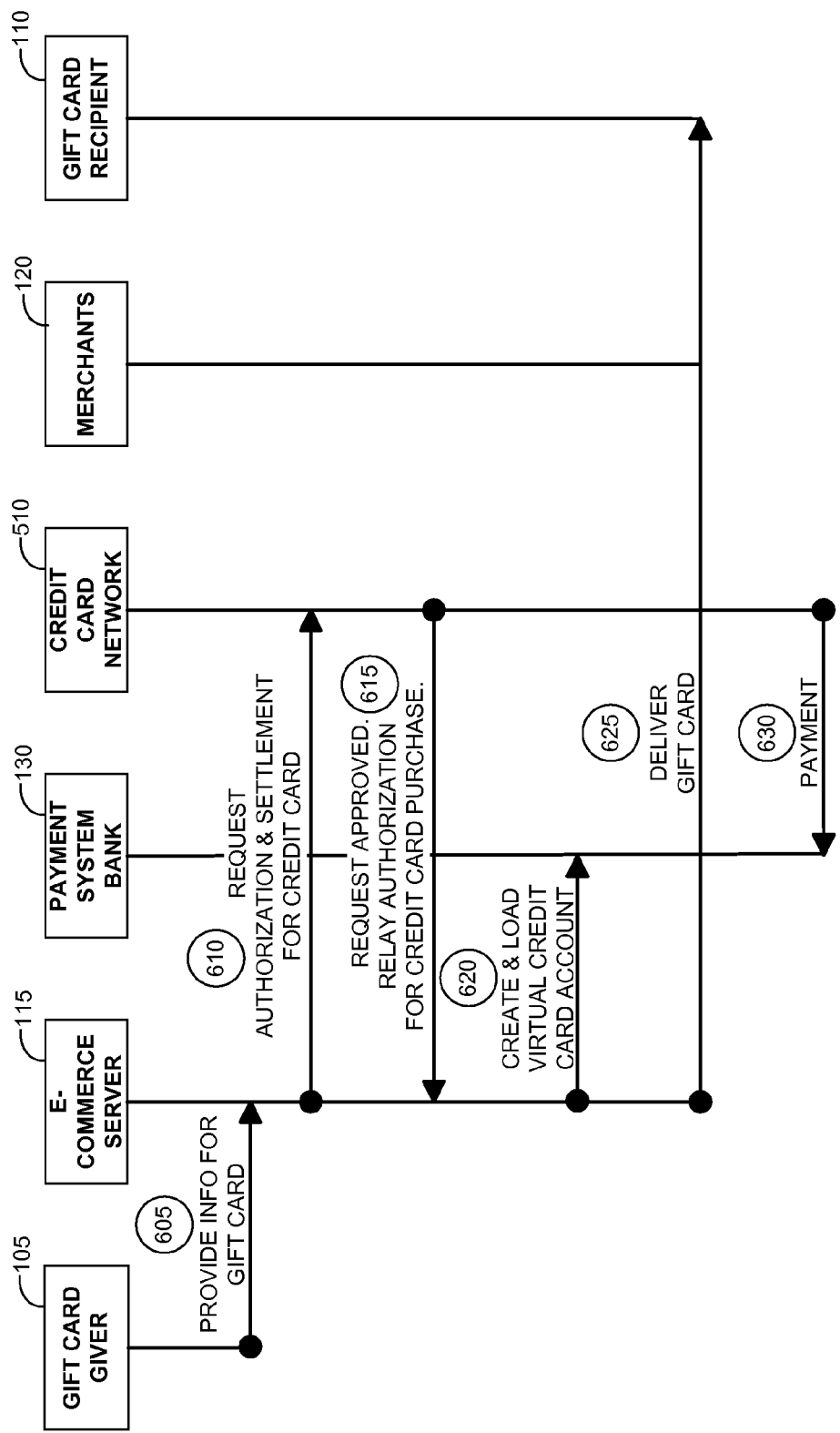
FIG. 6A is a simplified diagram of a method for issuing a gift card when the gift card is purchased using a credit card, in accordance with an embodiment of the present invention.

Now reference is made to FIG. 6A which is a simplified diagram of a method for issuing a gift card when the gift card is purchased using a credit card, in accordance with an embodiment of the present invention. During the process of purchasing a gift card, at step 505, gift card giver 105 selects credit card as the means of payment and provides the necessary credit card information including inter alia their name, type of credit card, credit card number and expiration date.

At step 610, e-commerce server 115 requests authorization and settlement for the purchase from credit card network 510 by providing the details about the credit card and the amount of purchase. The credit card information is sent to credit card network 510 for authorization and settlement. After authorization is received from giver's issuing bank 560, at step 615 credit card network 510 relays the authorization to e-commerce server 115.

Upon successful authorization, at step 620 e-commerce server 615 creates a virtual credit card account at payment system bank 130, loads it with the gift card amount and also creates a gift card record. Then, at step 625 e-commerce server 115 delivers the gift card to gift card recipient 110.

At step 630, the transaction is settled and giver's issuing bank 560 makes payment which is credited to card funding account 530 and the transaction is complete.

Figure 6B:
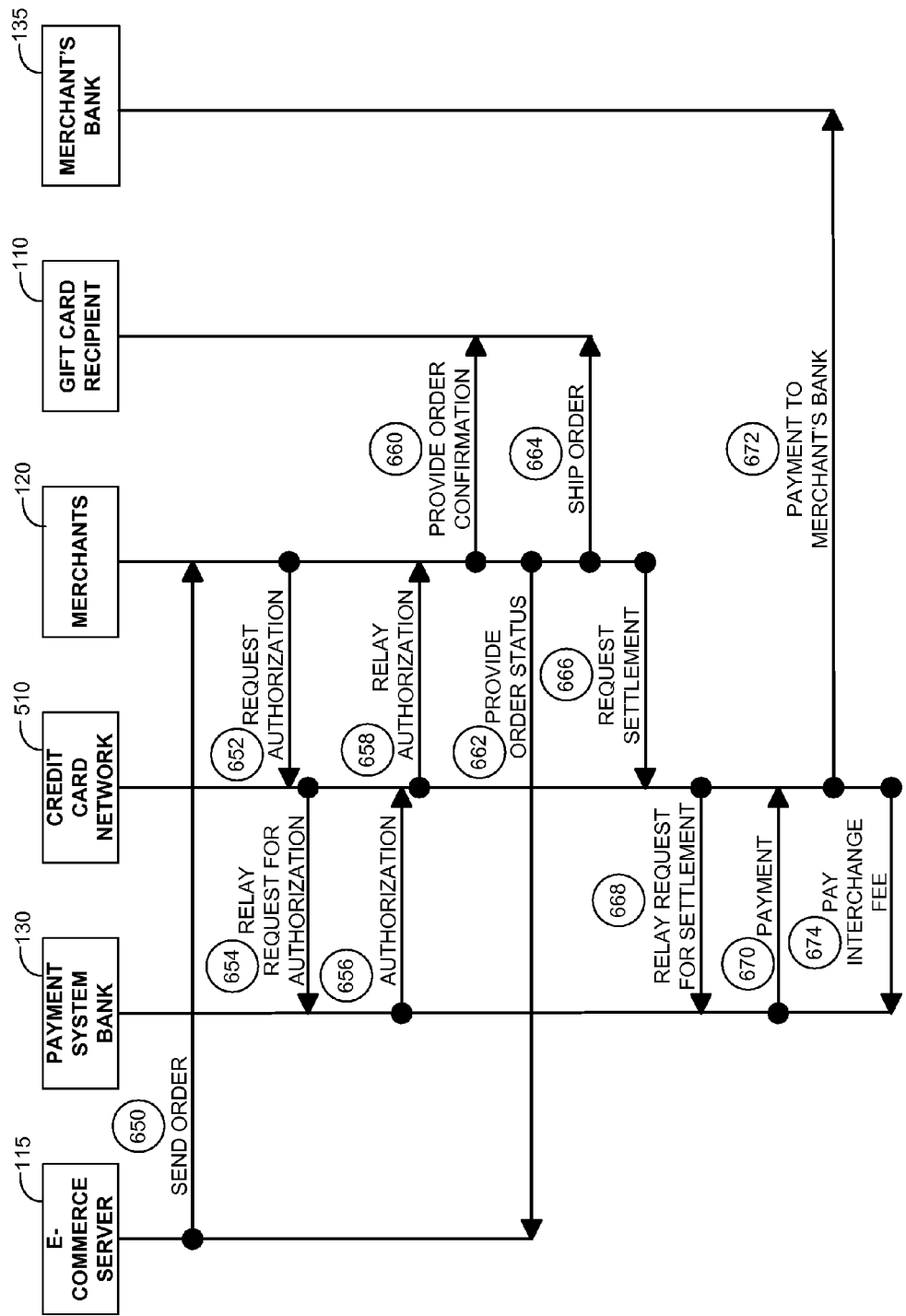
FIG. 6B is a simplified diagram of a method for redeeming a gift card using a virtual credit card account established by a multi-merchant e-commerce system, in accordance with an embodiment of the present invention.

Now reference is made to FIG. 6B which is a simplified diagram of a method for redeeming a gift card using a virtual credit card account established by a multi-merchant e-commerce system, in accordance with an embodiment of the present invention. As part of the gift card redemption process, e-commerce server 115 aggregates the items selected by gift card recipient 110 according to merchant 120 and at step 650 sends an order to each merchant 120 from which an item has been ordered. The present example describes the payment processing relative to a single order from a single merchant 120. E-commerce server 115 includes with the order information about the virtual credit card to be used to pay merchant 120 for the order. At step 652, merchant 120 uses credit card network 510 to request authorization for the credit card purchase. At step 654 credit card network 510 relays the request for authorization to payment system bank 130 which is the issuing bank for the virtual credit card. At step 656 payment system bank 130 authorizes the purchase by sending an authorization message to credit card network 510. Then, at step 658 credit card network 510 relays the authorization to merchant 120.

After receiving authorization, at step 660 merchant 120 provides a confirmation to gift card recipient 110 that the order has been successfully received and authorized. Such notification may also contain shipping details or other information concerning the order. At step 662 merchant 120 provides an order status message to e-commerce server 115 indicating that the order has been authorized. Such order status message may also contain shipping details or other information concerning the order.

At step 664 merchant 120 ships the order containing the selected items to the designated recipient. It may be appreciated that the shipment may occur at any time after the actual order. For example, if one or more of the items selected are not in stock there may be a shipping delay. Or, there may be a processing delay of one or several days while gathering, and packaging the items. In general, the precise details of the shipping process are outside the scope of the present invention.

At step 666 merchant 120 requests settlement for the amount of the order from credit card network 510. At step 668 credit card network 510 relays the request for settlement to payment system bank 130. At step 670 payment system bank 130 settles the transaction by making the requested payment using credit card network 510. At step 672 credit card network makes payment to a designated account in merchant's bank 135. Credit card network 510 retains the interchange fee which, at step 674, it pays to payment system bank 130. In one embodiment a percentage of the interchange fee is paid by payment system bank into fee account 540.

Figure 7:
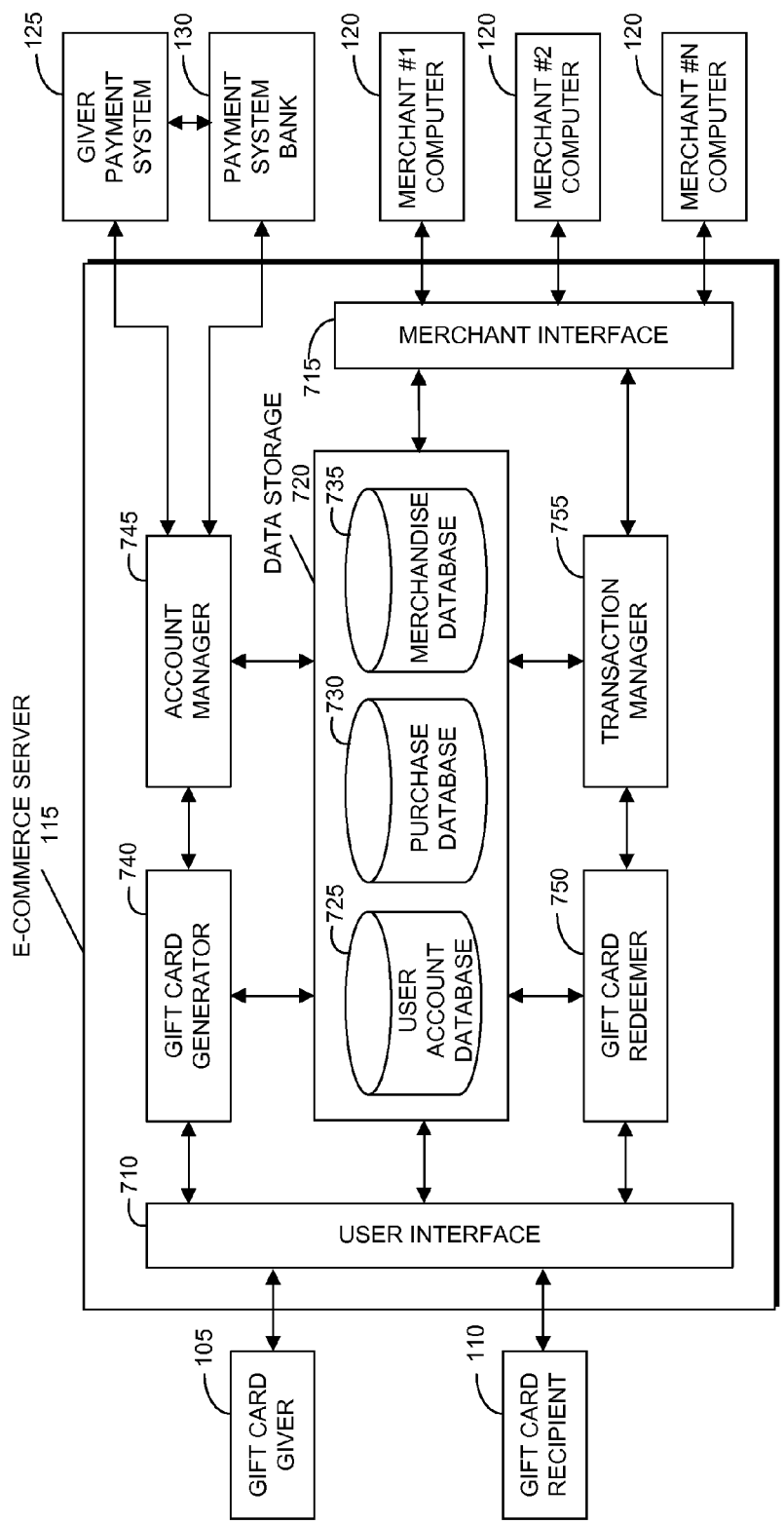
FIG. 7 is a simplified block diagram that describes the functions performed by an e-commerce server that supports a multi-merchant payment system, in accordance with an embodiment of the present invention.

Reference is now made to FIG. 7, which is a simplified block diagram of an e-commerce system that supports a multi-merchant payment system, in accordance with an embodiment of the present invention. Users interact with the website via a user interface 710, merchants interact with the website via a merchant interface 715, and e-commerce server 115 interacts with a payment system bank 130 and giver payment system 125 via an account manager 745.

A data storage 720 stores a user account database 725, a purchase database 730 and a merchandise database 735. It may be appreciated by one skilled in the art that data storage 720 refers to a logical storage system typically implemented using a relational database manager and does not imply or suggest a particular physical or hardware implementation. Merchandise database 735 stores a record for each item of merchandise or service published by any merchant 120. Each record includes (i) a stock keeping unit (SKU) for the item, (ii) a description of the item, (iii) a description of product options for the item, (iv) a price of the item with and without the product options, (v) shipping information for the item including shipping cost, and (vi) the merchant who provides the item. The SKU functions as a unique identifier for the item. The description generally includes one or more images of the item and a text description.

User account database 725 stores a record for each user, also referred to as a "shopper." Each record includes (i) a user name, (ii) billing and shipping address for the user, and (iii) means of payment information.

User interface 710 enables shoppers to browse and search merchandise database 735 for desired items of merchandise and services, and purchase desired items on-line. User interface 710 is typically a web interface composed of HTML web pages. Said HTML web pages may be static web pages stored as HTML files or may be generated dynamically in response to shopper requests. Merchant interface 715 enables merchants to add new items to merchandise database 735, remove old items of merchandise, and modify existing items.

A gift card generator 740 enables gift card giver 105 to purchase a gift card via user interface 710. Gift card generator 740 displays a data entry form that enables gift card giver 105 to supply inter alia the name and contact information for a gift card recipient 110, the amount of the gift card, and a credit card or other means of payment information. Gift card generator 740 creates a gift card record in a purchase database 730 and stores the data supplied by gift card giver 105 in the new gift card record. Purchase database 730 stores a gift card record for each gift card. Each such record includes (i) a unique identifier for the gift card, referred to as a gift card code, (ii) the name and contact information of the giver of the gift card, (iii) the date of purchase, (iv) means of payment information, (v) the initial amount of the gift card, (vi) the remaining balance of the gift card, (vii) the name and contact information of the gift card recipient, (viiii) an optional message from the gift card giver to the gift card recipient, and (ix) virtual credit card information for the gift card. The gift card code functions as a unique identifier for the gift card. Gift card generator 740 may request that gift card giver 105 sign in before beginning or concluding the gift card purchase. Gift card generator 740 uses information stored in user account database 725 as part of the sign-in process. If gift card giver 105 is not a registered user, then gift card generator 740 enables gift card giver 105 to register with e-commerce server 115. In this case, gift card generator 740 creates a new record in user account database 725 for gift card giver 105.

Account manager 745 processes the means of payment information provided by gift card giver 105. Account manager 745 makes payments to, or uses the means of payment information to cause payments to be made to, the card funding account 530. Account manager 745 further manages the payment and receipt of transaction fees. Account manager 745 tracks payments into and out of the card funding account and any other accounts in payment system bank 130. For each gift card, account manager 745 manages a virtual credit card that is used to make payments to merchants by performing operations including creating, loading, reloading, and closing the virtual credit card. Account manager 745 stores the virtual credit card information with the gift card record in purchase database 730.

After gift giver 105 purchases a gift card, a gift card redeemer 750 notifies gift card recipient 110 that they have been given a gift card and provides him/her with the previously described gift card code as well as instructions on how to redeem the gift card. Gift card redeemer 750 enables gift card recipient 110 to redeem his gift card. Gift card recipient 110 presents his/her gift identifier to gift card redeemer 750 via user interface 710. Gift card redeemer 750 may request that gift card recipient 110 sign in before beginning or concluding the gift card redemption process. It uses user information stored in user account database 725 as part of the sign-in process. If gift card recipient 110 is not a registered user, then gift card redeemer 750 enables gift card recipient 110 to register with e-commerce server 115. In this case, gift card redeemer 750 creates a new record in user account database 725 for gift card recipient 110.

In one embodiment, user interface 710 displays a counter with a running unspent balance, or alternatively a running total of current cost.

After gift card recipient 110 makes his/her selection of items, a transaction manager 755 enables gift card recipient 110 to check out, i.e. provide information necessary to complete the order, and review the order details. If the order total, which is the aggregate price of all items selected including tax, shipping and handling charges, is equal to the remaining balance of the gift card, the gift card is marked as "redeemed" in purchase database 730. In one embodiment, if the aggregate price is greater than the gift card amount, gift card recipient 110 is requested by transaction manager 755 to provide a means of payment to pay the difference between the total amount due for the items purchased and the balance of the gift card. The virtual credit card account is then reloaded with the full amount of the purchase and the gift card is marked as redeemed in purchase database 730. Alternatively, gift card recipient 110 may delete one or more items he/she selected in order to reduce the purchase price to less than the remaining balance of the gift card.

After gift card recipient 110 provides additional details, reviews and finalizes his/her order, transaction manager 755 aggregates the selected items according to each merchant 120. Transaction manager 755 then issues orders to each merchant 120 according to the aggregated selected items. Each order includes the virtual credit card information for the gift card being used as a means of payment that enables a merchant 120 to obtain payment for the selected items. As previously mentioned, from the perspective of merchants 120, a virtual credit card is the same as a standard credit card, i.e. merchants 120 process a virtual credit card in the same way that they process a standard credit card. Each merchant 120 ships the selected items indicated in their order to the designated address(es).

Figure 8:
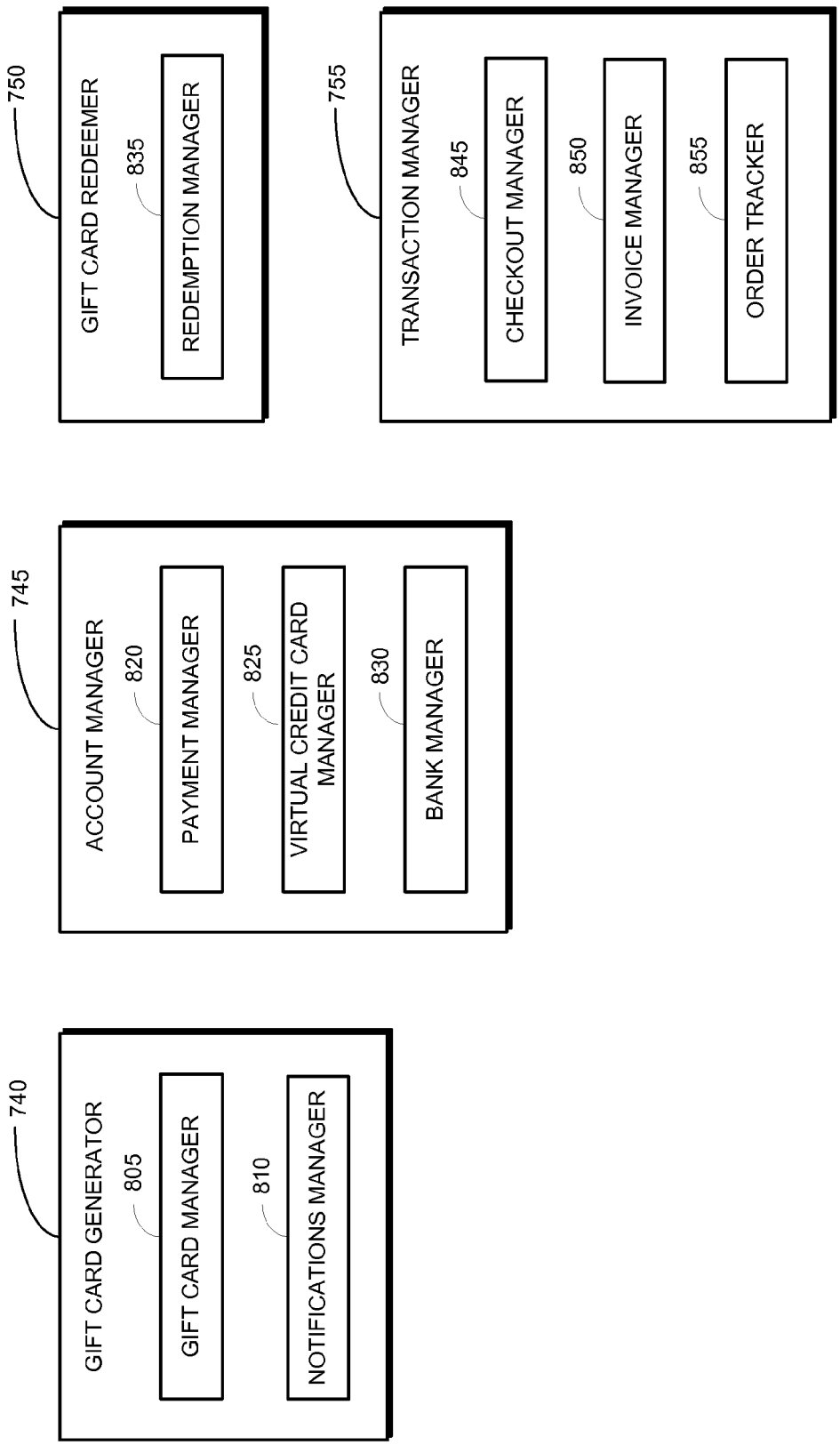
FIG. 8 is a simplified block diagram of various components of the e-commerce server illustrated in FIG. 7, in accordance with an embodiment of the present invention.

Reference is now made to FIG. 8, which is a simplified block diagram of various components of the e-commerce server illustrated in FIG. 7, in accordance with an embodiment of the present invention. Shown in FIG. 8 are subcomponents of gift card generator 740, account manager 745, gift card redeemer 750, and transaction manager 755.

Gift card generator 740 includes a gift card manager 805 that manages presentation of the gift card choices, including associated messages, an optional background, and optional multimedia including music, images and video. Gift card generator 740 uses transaction manager 755 to enable the gift giver to specify one or more recipients, the timing and method of delivery for the items included in the order, and personalized greetings and messages. Additionally, gift card generator 740 uses an invoice manager 855 to manage financial details of the gift card's purchase. Finally, gift card generator 740 includes a notifications manager 810 that notifies inter alia gift card recipient 110 that a gift card has been sent to him/her, gift card giver 105 that the gift has been redeemed or rejected, gift card giver 105 that the gift card recipient 110 has not yet redeemed his/her gift after a certain period of time, and gift card recipient 110 if any of the gift choices are not available.

Account manager 745 includes a payment manager 820 that manages the process of obtaining payment from giver payment system 125. Payment manager 820 is capable of interacting with credit card network 510 in the case that gift card giver 105 pays with a credit card. Payment manager 820 is further capable of redeeming points from reward points systems. It may be appreciated that payment manager 820 may operate with a wide variety of electronic payment systems. Account manager 745 further includes a virtual credit card manager 825 that creates a virtual credit card for each gift card that is purchased. Virtual credit card manager 825 stores information about the gift card order in purchase database 730. Virtual credit card manager 825 is capable of loading, reloading and closing a virtual credit card account. Account manager 745 further includes a bank manager 830 that manages interactions with payment system bank 130. Bank manager 830 verifies the balances in each of the accounts used by e-commerce server 115 including the card funding account and fee account. Bank manager 830 ensures that all necessary fees are paid to and collected from credit card network 510.

Gift card redeemer 750 includes a redemption manager 835 that manages presentation of any gift card related information presented to gift card recipient 110. Such related information may include a running counter that displays the amount of the gift card that has been spent and the amount remaining. Redemption manager 835 also provides tools that enable gift card recipient 110 to inter alia return a redeemed item, cancel a redeemed item, and request re-issuance of a gift card.

Transaction manager 755 includes a checkout manager 845 for managing the checkout process including obtaining delivery information, payment and billing information and for obtaining payment information from gift card recipient 110 in case the order total exceeds the gift card balance. Transaction manager 755 further includes an invoice manager 850 for invoicing gift card recipient 110 based upon his/her selected items, and an order tracker 855 for tracking the items ordered by the gift recipient 110.

It will be appreciated by those skilled in the art that the systems and methods of the present invention may be implemented within a variety of server-client network architectures. In this regard, reference is now made to FIG. 9, which is a simplified block diagram of an example client-server architecture for implementing a multi-merchant payment system, in accordance with an embodiment of the present invention. On the server side, the architecture in FIG. 9 includes one or more Web application servers 930 managed by load balancers 910, administration servers 920, search servers 940, and three databases. The databases include a transaction database 950 for recording purchase and payment information, including the data from purchase database 730 shown in FIG. 7, a product database 952 for storing product catalogue information, including the data from merchandise database 735, and a tracking database 954 for tracking shopper orders and shopper information including user account database 725. Web application servers 930 manage transaction database 950, product database 952, tracking database 954, and search servers 940. It may be appreciated by one skilled in the art that Web application servers 930 also act as Web servers in that they accept HTTP requests from Web browsers and serve them HTTP responses along with optional data contents, which usually are web pages such as HTML documents and linked objects (images, etc.). All of these server components are subsumed in e-commerce server computer 115.

Figure 9:
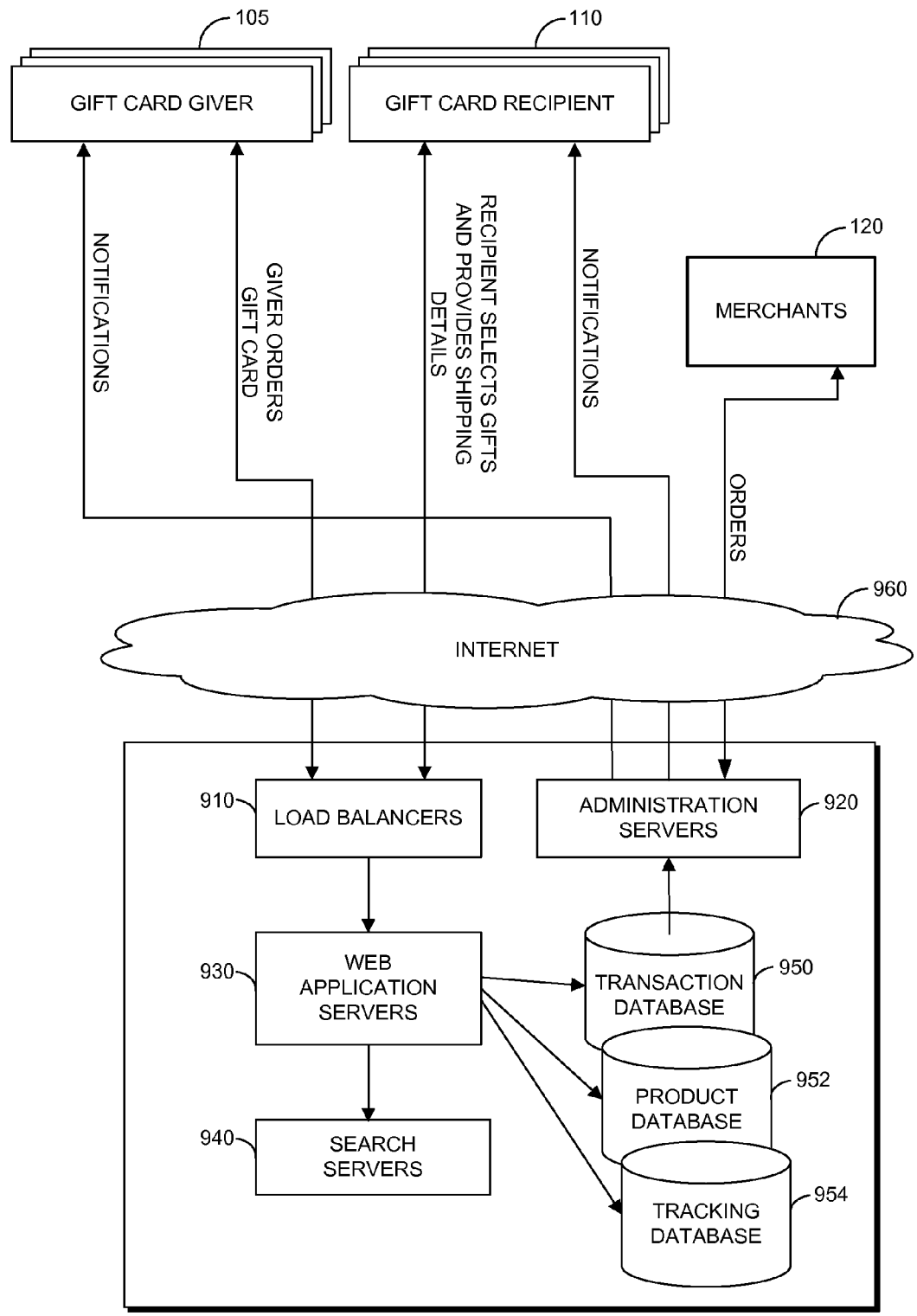
FIG. 9 is a simplified block diagram of an example client-server architecture for implementing a multi-merchant payment system, in accordance with an embodiment of the present invention.

On the client side, the architecture in FIG. 9 includes merchants 120, one or more gift card givers 105 using client computers, and one or more gift card recipients 110 using client computers. Merchants 120 have two-way connections with administration servers 930. Administration servers 920 send notifications to client computers. Thus, the client computers of gift card givers 105 and gift card recipients 110 have one-way connections with administration servers 920. The client computers of gift card givers 105 and gift card recipients 110 have two-way connections with load balancers 910.

Client-server communication is performed over the Internet 960.

Figure 10:
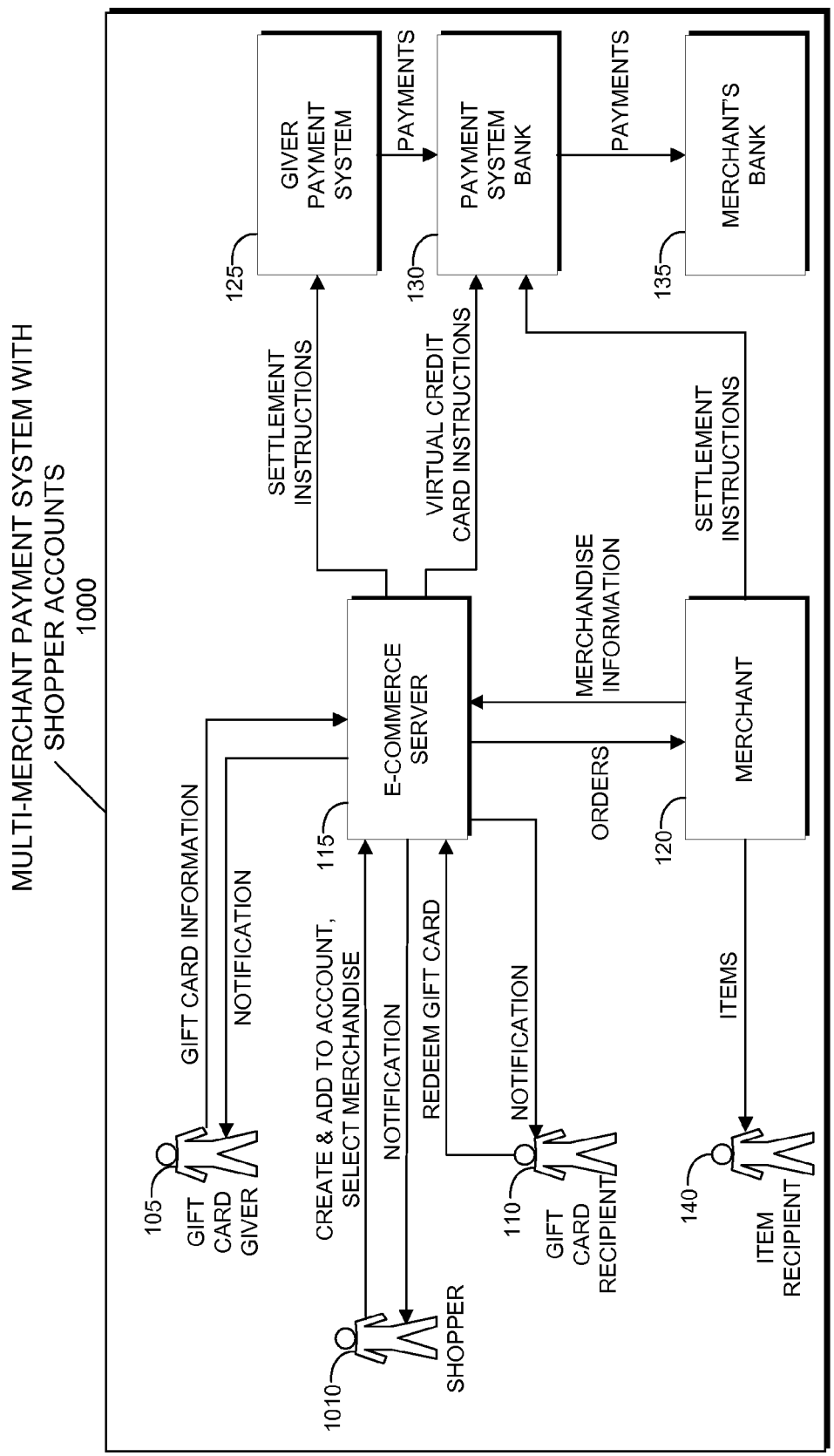
FIG. 10 is a simplified block diagram that, relative to FIG. 1, adds the ability for a shopper to create and add funds to a shopper account that he/she can use to make selections, in accordance with an embodiment of the present invention.

Reference is now made to FIG. 10, which is simplified block diagram that, relative to FIG. 1, adds the ability for a shopper to create and add funds to a shopper account that they can use to make selections, in accordance with an embodiment of the present invention. A multi-merchant payment system with shopper accounts 1000 is an alternative embodiment that enables a shopper using the multi-merchant website provided by e-commerce server 115 to create a "shopper account", add funds to a shopper account, make payments using a shopper account, and close a shopper account. A shopper account behaves identically to a gift card with the exceptions that shopper 1010 (1) creates and opens the account themselves, and (2) makes an initial deposit or payment into their shopper account.

To enable the creation and use of shopper accounts, ecommerce server 115 is enhanced to provide the following additional capabilities. Gift card generator 740, described with reference to FIG. 7 enables shopper 1010 to create and fund a shopper account via user interface 710. Gift card generator 740 displays a data entry form that enables shopper 1010 to supply inter alia the amount that they wish to add to their shopper account and a credit card or other means of payment information. Gift card generator 740 creates a new shopper record in purchase database 730 and stores the data supplied by shopper 1010 in the new record. Each such record includes (i) a unique identifier for the shopper account, referred to as a "shopper identifier", (ii) the name of the shopper, (iii) the date of purchase, (iv) means of payment information, (v) the amount to be added to the shopper account, (vi) the remaining balance of the shopper account, and (ix) virtual credit card information for the shopper account. The shopper identifier functions as a unique identifier for the shopper account. Gift card generator 740 may request that shopper 1010 sign in before adding funds to his/her shopper account. Gift card generator 740 uses shopper information stored in user account database 725 as part of the sign-in process. If shopper 1010 is not a registered user, then gift card generator 105 enables shopper 1010 to register with e-commerce server 115. In this case, gift card generator 740 creates a new record in user account database 725 for shopper 1010.

As with a gift card, once shopper 1010 makes an initial payment, e-commerce server 115 creates and loads a virtual credit card account. E-commerce server 115 notifies shopper 1010 when the shopper account has been successfully created and provides shopper 1010 with a unique shopper identifier. Shopper 1010 selects items from the e-commerce website provided by e-commerce server 115 and provides his/her shopper identifier as means of payment for said items.

Shopper 1010 may add funds to their shopper account at any time, in which case e-commerce server reloads the corresponding virtual credit card account using the means of payment provided by shopper 1010. Additionally, shopper 1010 may use multi-merchant payment system with shopper accounts 1000 to convert points from a reward points program to currency and add the currency to their shopper account. Subsequently shopper 1010 may shop for merchandise and services using the multi-merchant website provided by e-commerce server 115 and pay for said merchandise and services using their funded shopper account.

Figure 11:
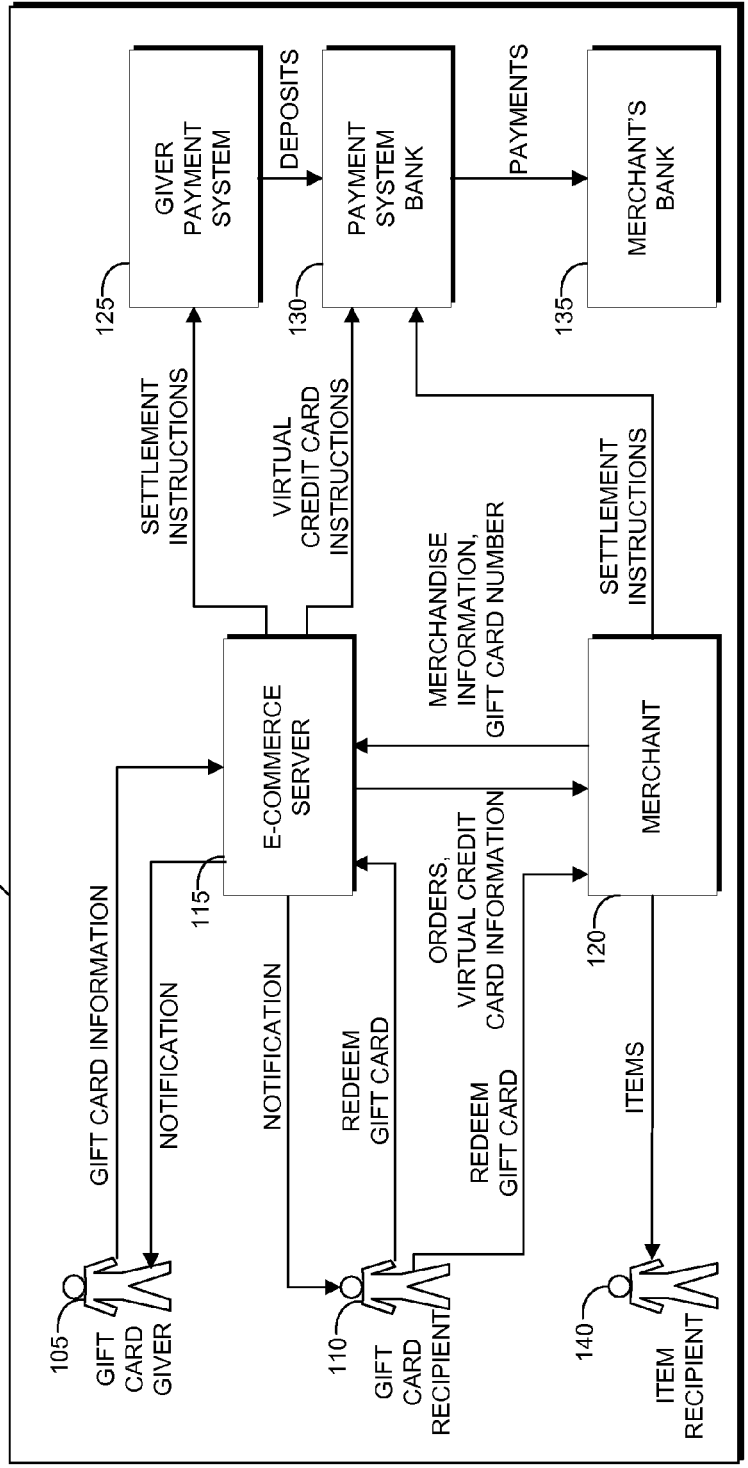
FIG. 11 is a simplified block diagram that, relative to FIG. 1, adds the ability for a gift card recipient to redeem his/her gift card at the e-commerce websites provided by a plurality of merchants, in accordance with an embodiment of the present invention.

Reference is now made to FIG. 11, which is a simplified block diagram that, relative to FIG. 1, adds the ability for a gift card recipient to redeem his/her gift card at the e-commerce websites provided by a plurality of merchants, in accordance with an embodiment of the present invention. A multi-merchant payment system with open shopping 1100 is an alternative embodiment that adds an "open shopping" service which enables gift card recipient 110 to redeem his/her gift card at the e-commerce websites provided by merchants 120 in addition to or in place of the multi-merchant website provided by e-commerce server 115. Merchants 120 that participate in the open shopping service allow gift card recipient 110 to pay for merchandise and services at their respective e-commerce websites using gift cards.

During the payment process, merchant 120 enables gift card recipient 110 to provide a gift card code as a means of payment. Merchant 120 then transmits the gift card code, the gift card recipient's name and potentially other information to e-commerce server 115 for authorization. E-commerce server 115 authenticates the gift card code provided by merchant 120 and in turn provides merchant 120 with the virtual credit card information that corresponds to the gift card, thus enabling merchant 120 to obtain payment from gift card recipient 110.

A further alternative embodiment of the present invention combines the enhanced capabilities described with reference to FIGS. 10 and 11. Specifically, this embodiment adds the ability for shopper 1010 to establish and use a shopping account and for shopper 1010 to use the account to select items from the e-commerce websites provided by merchants 120 that participate in the open shopping system described with reference to FIG. 11. Rather than provide a gift card code as means of payment to the e-commerce website provided by merchant 120, shopper 1010 provides his/her shopper identifier.

In reading the above description, persons skilled in the art will realize that there are many apparent variations that can be applied to the methods and systems described.

What is claimed is:

1. A computer-processor based method of payment for mufti-vendor gift cards, comprising:
   (a) maintaining, by an e-commerce server, a merchandise database comprising records for merchandise and services for a plurality of merchants, each record including (i) a stock keeping unit (SKU) for an item of merchandise or service, (ii) a description of the item, (iii) a price of the item, and (iv) the merchant for the item;
   (b) enabling, by the e-commerce server, a gift card giver to interactively purchase a gift card for a gift card recipient, entitling the gift card recipient to redeem the gift card for items up to a specified spending limit;
   (c) electronically transferring, by the e-commerce server, the money used to purchase the gift card into a card funding account that is used to pay for purchases by the gift card recipient;
   (d) enabling, by the e-commerce server, the gift card recipient to interactively select one or more items from the merchandise database, thereby generating an aggregated selection of items for each merchant;

(e) issuing orders, by the e-commerce server, to each merchant in accordance with the aggregated selected items corresponding to each merchant; and (f) paying, by the e-commerce server, each merchant the amount of their respective order from the card funding account.

2. The method of claim 1 wherein said enabling a gift card giver to interactively purchase a gift card comprises charging an electronic payment to a gift giver's credit card.

3. The method of claim 1 further comprising enabling the gift card recipient to redeem the gift card for items beyond a specified spending limit by electronically paying the difference between the spending limit and the amount of the items.

4. The method of claim 1 further comprising notifying a gift card recipient that they have received a gift card.

5. The method of claim 1 that further comprises maintaining a purchase database comprising records for gift cards, each record including (i) a gift card recipient, and (ii) a gift card balance that keeps track of the amount of money remaining on the gift card for use by said gift card recipient and reducing the gift card balance according to the one or more items selected by the gift card recipient.

6. A network computing device, comprising:

(a) a storage device useable to store a merchandise database comprising records for merchandise and services for a plurality of merchants, each record including (i) a stock keeping unit (SKU) for an item of merchandise or service, (ii) a description of the item, (iii) a price of the item, and (iv) the merchant for the item;

(b) a processor that is programmed to enable access to the storage device and to perform actions, comprising:

enabling a gift card giver to interactively purchase a gift card for a gift card recipient, entitling the gift card recipient to redeem the gift card for items up to a specified spending limit;

electronically transferring the money used to purchase the gift card into a card funding account that is used to pay for purchases by the gift card recipient;

enabling the gift card recipient to interactively select one or more items from the merchandise database, thereby generating an aggregated selection of items for each merchant;

issuing orders to each merchant in accordance with the aggregated selected items corresponding to each merchant, said orders including means of payment information that enables each merchant to obtain payment for the amount of their respective order from the card funding account.

7. The network computing device of claim 6 wherein the processor is operative to perform actions further comprising enabling the gift card giver to perform said interactively purchasing a gift card with the gift card giver's credit card.

8. The network computing device of claim 6 wherein the processor is operative to perform actions further comprising enabling-the gift card recipient to redeem the gift card for items beyond a specified spending limit by electronically paying the difference between the spending limit and the amount of the items.

9. The network computing device of claim 6 wherein the processor is operative to perform actions further comprising sending an electronic notification to the gift card recipient that they have received a gift card.

10. The network computing device of claim 6 wherein said data storage further comprises a purchase database comprising records for gift cards, each record including (i) a gift card recipient, and (ii) a gift card balance that keeps track of the amount of money remaining on the gift card for use by said gift card recipient and reducing the gift card balance according to the one or more items selected by the gift card recipient.

11. A non-transitory computer-readable storage medium storing program code for causing an e-commerce server:

(a) to maintain a merchandise database comprising records for merchandise and services for a plurality of merchants, each record including (i) a stock keeping unit (SKU) for an item of merchandise or service, (ii) a description of the item, (iii) a price of the item, and (iv) the merchant for the item;

(b) to enable a gift card giver to interactively purchase a gift card for a gift card recipient, entitling the gift card recipient to redeem the gift card for items up to a specified spending limit;

(c) to electronically transfer the money used to purchase the gift card into a card funding account that is used to pay for purchases by the gift card recipient;

(d) to enable the gift card recipient to interactively select one or more items from the merchandise database, thereby generating an aggregated selection of items for each merchant;

(e) to issue orders to each merchant in accordance with the aggregated selected items corresponding to each merchant; and (f) to pay each merchant the amount of their respective order from the card funding account.

12. A computer-processor based method of payment for mufti-vendor gift cards, comprising:

(a) maintaining, by an e-commerce server, a merchandise database comprising records for merchandise and services for a plurality of merchants, each record including (i) a stock keeping unit (SKU) for an item of merchandise or service, (ii) a description of the item, (iii) a price of the item, and (iv) the merchant for the item;

(b) enabling, by an e-commerce server, a gift card giver to interactively purchase a gift card for a gift card recipient, entitling the gift card recipient to redeem the gift card for items up to a specified spending limit;

(c) creating, by an e-commerce server, a virtual credit card account for said gift card to enable payment for the items redeemed by the gift card recipient;

(d) enabling, by the e-commerce server, the gift card recipient to interactively select one or more items from the merchandise database, thereby generating an aggregated selection of items for each merchant;

(e) issuing orders, by the e-commerce server, to each merchant in accordance with the aggregated selected items corresponding to each merchant; and (f) providing information about the virtual credit card, by the e-commerce server, to each merchant for obtaining payment for the orders issued to the merchant.

13. The method of claim 12 wherein said enabling a gift card giver to purchase a gift card comprises charging an electronic payment to a gift giver's credit card.

14. The method of claim 12 further comprising enabling the gift card recipient to redeem the gift card for items beyond a specified spending limit by electronically paying the difference between the spending limit and the amount of the items.

15. The method of claim 12 further comprising electronically notifying a gift card recipient that they have received a gift card.

16. The method of claim 12 wherein said enabling the gift card recipient further comprises enabling the gift card recipient to select one or more items from one or more merchants' e-commerce websites, wherein said providing information about the virtual credit card comprises providing a unique gift card code to the merchants' e-commerce websites as a means of payment and wherein said purchase database is provided by an e-commerce server that is communicatively coupled with said merchants' e-commerce websites, the method further comprising enabling said merchants' websites to provide a unique gift card code to said e-commerce server.

17. A network computing device for e-commerce, comprising:
   (a) a storage device useable to store a merchandise database comprising records for merchandise and services for a plurality of merchants, each record including (i) a stock keeping unit (SKU) for an item of merchandise or service, (ii) a description of the item, (iii) a price of the item, and (iv) the merchant for the item;
   (b) a processor that is programmed to enable access to the storage device and to perform actions, comprising:
      enabling a gift card giver to interactively purchase a gift card for a gift card recipient, entitling the gift card recipient to redeem the gift card for items up to a specified spending limit;
      creating a virtual credit card account for said gift card to enable payment for the items redeemed by the gift card recipient;
      enabling the gift card recipient to interactively select one or more items from the merchandise database, thereby generating an aggregated selection of items for each merchant; and
      issuing orders to each merchant in accordance with the aggregated selected items corresponding to each merchant, said orders including virtual credit card information that enables each merchant to obtain payment for the amount of their respective order.

18. The network computing device of claim 17 wherein the processor is operative to perform actions further comprising charging an electronic payment to a gift giver's credit card.

19. The network computing device of claim 17 wherein the processor is operative to perform actions further comprising redeeming, by the gift card recipient, the gift card for items beyond a specified spending limit by electronically paying the difference between the spending limit and the amount of the items.

20. The network computing device of claim 17 wherein the processor is operative to perform actions further comprising sending an electronic notification to the gift card recipient that they have received a gift card.

21. A non-transitory computer-readable storage medium storing program code for causing a computing device:
   (a) to maintain a merchandise database comprising records for merchandise and services for a plurality of merchants, each record including (i) a stock keeping unit (SKU) for an item of merchandise or service, (ii) a description of the item, (iii) a price of the item, and (iv) the merchant for the item;
   (b) to enable a gift card giver to interactively purchase a gift card for a gift card recipient, entitling the gift card recipient to redeem the gift card for items up to a specified spending limit;
   (c) to create a virtual credit card account for said gift card to enable payment for the items redeemed by the gift card recipient;
   (d) to enable the gift card recipient to interactively select one or more items of merchandise and services from the merchandise database, thereby generating an aggregated selection of items for each merchant;
   (e) to issue orders to each merchant in accordance with the aggregated selected items corresponding to each merchant; and
   (f) to provide information about the virtual credit card to each merchant for obtaining payment for the orders issued to the merchant.

22. A computer-processor based method of electronic payment, comprising:
   (a) maintaining, by an e-commerce server, a merchandise database comprising records for merchandise and services for a plurality of merchants, each record including (i) a stock keeping unit (SKU) for an item of merchandise or service, (ii) a description of the item, (iii) a price of the item, and (iv) the merchant for the item;
   (b) enabling, by the e-commerce server, a shopper to interactively create a shopper account that enables the shopper to purchase merchandise and services recorded in said merchandise database;
   (c) maintaining a purchase database, by the e-commerce server, comprising records for shopper accounts, each record including (i) a unique shopper identifier, (ii) a shopper name, and (iii) a shopper account balance that keeps track of the amount of money available to said shopper;
   (d) creating a virtual credit card account for said shopper account, by the e-commerce server, to enable payment for merchandise and services selected by the shopper;
   (e) enabling the shopper to interactively select one or more items from the merchandise database, by the e-commerce server, thereby generating an aggregated selection of items for each merchant;
   (f) issuing orders to each merchant, by the e-commerce server, in accordance with the aggregated selected items corresponding to each merchant; and
   (g) providing information about the virtual credit card to each merchant, by the e-commerce server, for obtaining payment for the orders issued to the merchant.

23. The method of claim 22 wherein said interactively creating a shopper account comprises adding funds to the shopper account by charging an electronic payment to a shopper's credit card.

24. The method of claim 22 further comprising enabling, by the e-commerce server, the shopper to electronically pay the difference between the cumulative price of said one or more items interactively selected by the shopper and the shopper account balance if the cumulative price exceeds the shopper account balance.

25. A network computing device, comprising:
   (a) a storage device useable to store: (1) a merchandise database comprising records for merchandise and services for a plurality of merchants, each record including (i) a stock keeping unit (SKU) for an item of merchandise or service, (ii) a description of the item, (iii) a price of the item, and (iv) the merchant for the item; and a purchase database comprising records for shopper accounts, each record including (i) a unique shopper identifier, (ii) a shopper name, and (iii) a shopper account balance that keeps track of the amount of money available to said shopper;
   (b) a processor that is programmed to enable access to the storage device and to perform actions, comprising:
      enabling a shopper to interactively create a shopper account that enables the shopper to purchase merchandise and services recorded in said merchandise database;
      creating a virtual credit card account for said shopper account to enable payment for merchandise and services selected by the shopper;

enabling the shopper to interactively select one or more items from the merchandise database, thereby generating an aggregated selection of items for each merchant; and issuing orders to each merchant in accordance with the aggregated selected items corresponding to each merchant, said orders including virtual credit card information that enables each merchant to obtain payment for the amount of their respective order.

26. The network computing device of claim 25 wherein the processor is operative to perform actions further comprising charging an electronic payment to a shopper's credit card.

27. The network computing device of claim 25 wherein the processor is operative to perform actions further comprising enabling the gift card recipient to redeem the gift card for items beyond a specified spending limit by electronically paying the difference between the spending limit and the amount of the items.

28. A non-transitory computer-readable storage medium storing program code for causing a computing device:
   (a) to maintain a merchandise database comprising records for merchandise and services for a plurality of merchants, each record including (i) a stock keeping unit (SKU) for an item of merchandise or service, (ii) a description of the item, (iii) a price of the item, and (iv) the merchant for the item;
   (b) to enable a shopper to interactively create a shopper account that enables the shopper to purchase merchandise and services recorded in said merchandise database;
   (c) to maintain a purchase database comprising records for shopper accounts, each record including (i) a unique shopper identifier, (ii) a shopper name, and (iii) a shopper account balance that keeps track of the amount of money available to said shopper;
   (d) to create a virtual credit card account for said shopper account to enable payment for merchandise and services selected by the shopper;
   (e) to enable the shopper to interactively select one or more items from the merchandise database, thereby generating an aggregated selection of items for each merchant;
   (f) to issue orders to each merchant in accordance with the aggregated selected items corresponding to each merchant; and
   (g) to provide information about the virtual credit card to each merchant for obtaining payment for the orders issued to the merchant.

29. A computer-processor based method of electronic payment, comprising:
   (a) enabling, by a payment server, a shopper to interactively create a shopper account;
   (b) maintaining a purchase database, by the payment server, comprising records for shopper accounts, each record including (i) a unique shopper identifier, (ii) a shopper name, and (iii) a shopper account balance that keeps track of the amount of money available to said shopper and comprising records for merchants;
   (c) enabling the shopper to interactively select one or more items from a plurality of-merchants' e-commerce websites; and
   (d) enabling, by the payment server, the shopper to provide said unique shopper identifier as a means of payment to the merchants' e-commerce websites.

30. The method of claim 29 further comprising:
   (e) creating a virtual credit card account for said shopper account to enable payment for merchandise and services selected by the shopper; and
   (f) providing, by said payment server, information about said virtual credit card account to a merchant's e-commerce website in response to receiving the unique shopper identifier therefrom.

31. The method of claim 29 wherein said creating a shopper account comprises adding funds to the shopper account by charging an electronic payment to a shopper's credit card.

32. The method of claim 29 wherein said creating a shopper account comprises adding funds to the shopper account by converting points from a reward system such as inter alia an airline or hotel rewards system.

33. A system of electronic payment, comprising:
   (a) a payment server comprising:
      a storage device useable to store a purchase database comprising records for shopper accounts, each record including (i) a unique shopper identifier, (ii) a shopper name, and (iii) a shopper account balance that keeps track of the amount of money available to said shopper and comprising records for merchants; and
      a processor that is programmed to enable access to the storage device and to perform actions, comprising:
         enabling a shopper to interactively create a shopper account;
   (b) a plurality of merchant's e-commerce websites, each merchant's e-commerce website (i) enabling the shopper to interactively select one or more items, and (ii) enabling the shopper to provide said unique shopper identifier as a means of payment; and (iii) transmitting said unique shopper identifier to the payment server for redemption.

34. The system of claim 33 wherein the processor is operative to perform actions further comprising:
   creating a virtual credit card account for said shopper account to enable payment for said interactively selected one or more items selected by the shopper; and
   providing information about said virtual credit card account to a merchant's e-commerce website for payment for said interactively selected one or more items in response to receiving the unique shopper identifier therefrom.

35. The system of claim 33 wherein said creating a shopper account comprises adding funds to the shopper account by charging an electronic payment to a shopper's credit card.

36. The system of claim 33 wherein the processor is operative to perform actions further comprising enabling the shopper to add funds to a shopper account by charging an electronic payment to the shopper's credit card.

37. A non-transitory computer-readable storage medium storing program code for causing a computing device:
   (a) to enable a shopper to interactively create a shopper account;
   (b) to maintain a purchase database, by a payment server, comprising records for shopper accounts, each record including (i) a unique shopper identifier, (ii) a shopper name, and (iii) a shopper account balance that keeps track of the amount of money available to said shopper and comprising records for merchants;
   (c) to enable the shopper to interactively select one or more items from a plurality of merchants' e-commerce websites; and
   (d) to enable the shopper to provide said unique shopper identifier as a means of payment to the merchants' e-commerce websites.

* * * * *